(12) United States Patent
Yamada

(10) Patent No.: US 8,384,807 B2
(45) Date of Patent: Feb. 26, 2013

(54) IMAGING ELEMENT, DRIVE DEVICE FOR AN IMAGING ELEMENT, DRIVE METHOD FOR AN IMAGING ELEMENT, IMAGE PROCESSING DEVICE, IMAGE PROCESSING METHOD, AND IMAGING DEVICE

(75) Inventor: Isao Yamada, Tokyo (JP)

(73) Assignee: Acutelogic Corporation, Tokyo (JP)

( * ) Notice: Subject to any disclaimer, the term of this patent is extended or adjusted under 35 U.S.C. 154(b) by 0 days.

(21) Appl. No.: 13/264,094

(22) PCT Filed: Sep. 10, 2010

(86) PCT No.: PCT/JP2010/065592
§ 371 (c)(1),
(2), (4) Date: Oct. 12, 2011

(87) PCT Pub. No.: WO2011/058814
PCT Pub. Date: May 19, 2011

(65) Prior Publication Data
US 2012/0038801 A1 Feb. 16, 2012

(30) Foreign Application Priority Data
Nov. 16, 2009 (JP) ................................. 2009-261180

(51) Int. Cl.
*H04N 3/14* (2006.01)
*H04N 5/335* (2011.01)
*H04N 9/04* (2006.01)

(52) U.S. Cl. ........ 348/272; 348/273; 348/274; 348/280; 348/281; 348/282

(58) Field of Classification Search .......... 348/272–274, 348/280–282; 382/298–300
See application file for complete search history.

(56) References Cited

U.S. PATENT DOCUMENTS
6,992,714 B1   1/2006   Hashimoto et al.
2003/0231251 A1   12/2003   Tsukioka
(Continued)

FOREIGN PATENT DOCUMENTS
JP   2001-036920 A   2/2001
JP   2004-015772 A   1/2004
(Continued)

OTHER PUBLICATIONS
International Search Report mailed on Oct. 19, 2010 in corresponding International Application No. PCT/JP2010/065592.

*Primary Examiner* — Yogesh Aggarwal
(74) *Attorney, Agent, or Firm* — Marvin A. Motsenbocker; Mots Law, PLLC

(57) ABSTRACT

An imaging element includes: a plurality of color filters arranged in a Bayer array; photoelectric conversion elements provided for the respective color filters; a signal adder circuit which carries out additions in each of the unit grids, by (i) adding up signals outputted from two photoelectric conversion elements corresponding to different colors of two color filters out of four color filters, and (ii) adding up signals outputted from two photoelectric conversion elements corresponding to remaining two color filters; and an A/D converter. The imaging element outputs: (i) a first digital image signal where signals of one color out of Ye (yellow) and Cy (cyan), and signals of G, are alternately placed; and (ii) a second digital image signal where signals of an other color out of Ye and Cy, which is different from the one color, and signals of Mg (magenta), are alternately placed.

18 Claims, 11 Drawing Sheets

U.S. PATENT DOCUMENTS

| | | | |
|---|---|---|---|
| 2005/0157191 A1* | 7/2005 | Shimizu et al. | 348/272 |
| 2005/0189472 A1 | 9/2005 | Asaba | |
| 2008/0075394 A1* | 3/2008 | Huang et al. | 382/300 |
| 2009/0195683 A1 | 8/2009 | Honda et al. | |
| 2010/0277628 A1 | 11/2010 | Sawada et al. | |

FOREIGN PATENT DOCUMENTS

| | | |
|---|---|---|
| JP | 2005-244995 A | 9/2005 |
| JP | 2009-147489 A | 7/2009 |
| JP | 2009-159186 A | 7/2009 |

\* cited by examiner

FIG.9(a)

| 1X | 2V | 1X | 2V | 1X |
| 1X | 2H | 1X | 2H | 1X |
| 2V | 1X | 2V | 1X | 2V |
| 2H | 1X | 2H | 1X | 2H |
| 1X | 2V | 1X | 2V | 1X |

FIG.9(b)

| G | Ye$_V$ | G | Ye$_V$ | G |
| G | Ye$_H$ | G | Ye$_H$ | G |
| Ye$_V$ | G | Ye$_V$ | G | Ye$_V$ |
| Ye$_H$ | G | Ye$_H$ | G | Ye$_H$ |
| G | Ye$_V$ | G | Ye$_V$ | G |

FIG.9(c)

| Mg | Cy$_V$ | Mg | Cy$_V$ | Mg |
| Mg | Cy$_H$ | Mg | Cy$_H$ | Mg |
| Cy$_V$ | Mg | Cy$_V$ | Mg | Cy$_V$ |
| Cy$_H$ | Mg | Cy$_H$ | Mg | Cy$_H$ |
| Mg | Cy$_V$ | Mg | Cy$_V$ | Mg |

FIG.9(d)

| G | Ye | G | Ye | G |
| Ye | G | Ye | G | Ye |

FIG.9(e)

| Mg | Cy | Mg | Cy | Mg |
| Cy | Mg | Cy | Mg | Cy |

FIG.9(f)

| 2V | 1X | 2V | 1X | 2V |
| 1X | 2H | 1X | 2H | 1X |
| 1X | 2V | 1X | 2V | 1X |
| 2H | 1X | 2H | 1X | 2H |
| 2V | 1X | 2V | 1X | 2V |

FIG.9(g)

| Ye$_V$ | G | Ye$_V$ | G | Ye$_V$ |
| G | Ye$_H$ | G | Ye$_H$ | G |
| G | Ye$_V$ | G | Ye$_V$ | G |
| Ye$_H$ | G | Ye$_H$ | G | Ye$_H$ |
| Ye$_V$ | G | Ye$_V$ | G | Ye$_V$ |

FIG.9(h)

| Cy$_V$ | Mg | Cy$_V$ | Mg | Cy$_V$ |
| Mg | Cy$_H$ | Mg | Cy$_H$ | Mg |
| Mg | Cy$_V$ | Mg | Cy$_V$ | Mg |
| Cy$_H$ | Mg | Cy$_H$ | Mg | Cy$_H$ |
| Cy$_V$ | Mg | Cy$_V$ | Mg | Cy$_V$ |

FIG.9(i)

| G | Ye | G | Ye | G |
| Ye | G | Ye | G | Ye |

FIG.9(j)

| Mg | Cy | Mg | Cy | Mg |
| Cy | Mg | Cy | Mg | Cy |

FIG.10(a)

| 1X | 2V | 1X | 2V |
|----|----|----|----|
| 2V | 1X | 2V | 1X |
| 1X | 2V | 1X | 2V |
| 2V | 1X | 2V | 1X |

FIG.10(b)

| 1X | 2H | 1X | 2H |
|----|----|----|----|
| 2H | 1X | 2H | 1X |
| 1X | 2H | 1X | 2H |
| 2H | 1X | 2H | 1X |

FIG.10(c)

| 1X | 2V | 1X | 2V |
|----|----|----|----|
| 2H | 1X | 2H | 1X |
| 1X | 2V | 1X | 2V |
| 2H | 1X | 2H | 1X |

FIG.10(d)

| 1X | 2H | 1X | 2H |
|----|----|----|----|
| 2V | 1X | 2V | 1X |
| 1X | 2H | 1X | 2H |
| 2V | 1X | 2V | 1X |

IMAGING ELEMENT, DRIVE DEVICE FOR AN IMAGING ELEMENT, DRIVE METHOD FOR AN IMAGING ELEMENT, IMAGE PROCESSING DEVICE, IMAGE PROCESSING METHOD, AND IMAGING DEVICE

TECHNICAL FIELD

The present invention relates to: an imaging element, in particular, an imaging element having color filters arranged in a Bayer array; a drive device of an imaging element; a method of driving an imaging element; an image processing device; a program; and an imaging device.

BACKGROUND ART

Recently, there has been provided a digital camera which is capable of recording of high-speed moving images such as HD (high-definition) moving images. In response to a demand in still image capture, a 12-megapixel image sensor is used. On the other hand, the number of pixels of an HD moving image outputted is horizontal 1920 pixels by vertical 1080 pixels, and therefore, its total number of pixels is 2.1 megapixels. Accordingly, in order to realize a digital camera capable of capturing a high-definition still image and an HD moving image with a same image sensor, it is necessary to limit the number of pixel signals outputted from the image sensor in moving image capture.

A known method to limit the number of pixel signals outputted from the image sensor is cut-out output in which a part of a screen is cut out and then outputted. For example, in the cut-out output, an image sensor capable of outputting a 12-megapixel still image outputs a 2.1-megapixel moving image in such a way that a central part of the screen which is approximately one-quarter of the entire screen is cut out and outputted. However, this method is disadvantageous in that the angle of view in moving image capture is narrower than that in still image capture.

As other method to limit the number of pixel signals outputted from the image sensor, there has been known: decimation output in which pixel signals are outputted after some of them are decimated; and pixel mixture output in which a plurality of pixel signals of a same color are mixed with one another and then outputted (see Patent Literatures 1, 2, and 3). For example, by performing decimation or pixel mixture, a signal for one pixel is outputted based on signals for vertical 2 pixels by horizontal 2 pixels, and thereby an output data rate is reduced to ¼.

Prior Art Document
Patent Literature
Patent Literature 1: Japanese Unexamined Patent Publication No. 2005-244995
Patent Literature 2: Japanese Unexamined Patent Publication No. 2009-159186
Patent Literature 3: Japanese Unexamined Patent Publication No. 2009-147489

SUMMARY OF INVENTION

Technical Problem
However, the decimation output is disadvantageous in that, as a result of limiting the number of pixel signals outputted from the image sensor, there are pixel signals which have been generated from light received by the image sensor but are not read out, and this causes reduction in sensitivity of outputted image data.

On the other hand, referring to an imaging device disclosed in Patent Literature 1, pixel signals are not decimated, but pixel signals of the same color are added up and then outputted. However, when pixel signals of the same color aligned in a vertical direction are added up in a CMOS sensor, it is difficult to construct a pixel structure for transmitting pixel signals at respective positions far from one another to one FD (floating diffusion), and downsizing of the sensor is also difficult.

In another example where pixel signals are added up, which is proposed in Patent Literature 2, pixel signals are added up and then read out in such a way that, to an FD shared by a Gr pixel and a Gb pixel (two pixels of the same color) obliquely adjacent to each other, electrical charges of the Gr and Gb pixels are transferred at the same time. Further, to an FD shared by an R pixel and a B pixel (two pixels of different colors) obliquely adjacent to each other, an electrical charge of either of the R pixel or the B pixel is transferred, and its signal is read out. In this case, although the electrical charges of the Gr and Gb pixels are added up, signals for the R and B pixels are subjected to decimation and then read out. This is disadvantageous in terms of chromatic noise compared to the case where the pixel signals are added up, and as a result, high-quality image signals are not generated.

Another idea is that, pixels signals at a plurality of sampling positions, which are outputted from the image sensor, are mixed with one another in a predetermined ratio and then outputted, however, the larger the number of sampling positions, the larger the number of pixel signals read out in the sensor, and there is a possibility that excessively high operation speed or excessively large power consumption is needed for readout of pixel signals.

An object of the present invention is to provide: an imaging element; a drive device of an imaging element; a method of driving an imaging element; an image processing device; a program; and an imaging device, each of which is capable of generating high-quality image signals while maintaining operation speed or power consumption needed for readout of pixel signals within an appropriate range, without presenting difficulty in constructing a pixel structure for adding up pixel signals.

Solution to Problem

The invention related to an imaging element of Claim 1, which has been made in order to achieve the above object, includes: a plurality of color filters arranged in a Bayer array where two-row-by-two-column unit grids of primary colors of R (red), G (green), and B (blue) are arranged; photoelectric conversion elements provided for the respective color filters, each of which elements outputs an analog signal corresponding to an intensity of light having passed through an associated color filter; a signal adder circuit which carries out additions in each of the unit grids, by (i) adding up signals outputted from two photoelectric conversion elements corresponding to different colors of two color filters out of four color filters, and (ii) adding up signals outputted from two photoelectric conversion elements corresponding to remaining two color filters, and then outputs analog signals corresponding to respective results of the additions; and an A/D converter which converts the signals outputted from the signal adder circuit to digital signals and outputs the digital signals; in which, based on the signals outputted from the signal adder circuit, the imaging element outputs: (i) a first digital image signal where signals of one color out of Ye (yellow) and Cy (cyan), and signals of G, are alternately placed; and (ii) a second digital image signal where signals of an other color out of Ye and Cy, which is different from the one color, and signals of Mg (magenta), are alternately placed.

In the imaging element of Claim 1, signals outputted from two photoelectric conversion elements are added up and then read out in each unit grid, so the number of pixel signals read out per frame is decreased. In the case where a frame rate is fixed for example, this causes a reduction in an operating frequency and/or an A/D conversion rate in the imaging element, leading to a reduction in power consumption. On the other hand, in the case where the operating frequency and the A/D conversion rate are fixed, an increase in the frame rate is possible. Since pixel signals adjacent to each other in each unit grid are added up, there is no difficulty in construction of a pixel structure. Further, pixel signals are not decimated, but are added up and outputted, so this improves its sensitivity in readout of pixel signals. Furthermore, when brightness signals are generated by adding up signals of the first digital image signal and the second digital image signal which are outputted from the imaging element of the present invention, each brightness signal is generated by adding up two pixel signals, and therefore the sensitivity is further improved.

The imaging element of Claim 1 may have a structure such that: as described in Claim 2, the signal adder circuit carries out additions of signals outputted from the photoelectric conversion elements in each of the unit grids, in accordance with any of a first to a third patterns which are different from one another; the first pattern is configured so that, in each of the unit grids, signals outputted from two photoelectric conversion elements respectively corresponding to two G color filters are added up and signals outputted from two photoelectric conversion elements respectively corresponding to R and B color filters; the second pattern is configured so that, in each of the unit grids, signals outputted from two photoelectric conversion elements respectively corresponding to G and R color filters aligned in a row direction are added up, and signals outputted from two photoelectric conversion elements respectively corresponding to B and G color filters aligned in the row direction are added up; and the third pattern is configured so that, in each of the unit grids, signals outputted from two photoelectric conversion elements respectively corresponding to G and B color filters aligned in a column direction are added up, and signals outputted from two photoelectric conversion elements respectively corresponding to R and G color filters aligned in the column direction are added up. In this structure, as a result of additions in accordance with the first pattern, a G pixel data and an Mg pixel signal are generated; as a result of additions in accordance with the second pattern (additions of pixel signals aligned in the row direction), a Cy pixel signal and a Ye pixel signal are generated; and as a result of additions in accordance with the third pattern (additions of pixel signals aligned in the column direction) a Cy pixel signal and a Ye pixel signal are generated. Accordingly, based on the pixel signals generated as a result of these additions, the first digital image signal and the second digital image signal are generated appropriately.

Further, the imaging element of Claim 2 may have a structure such that, as described in Claim 3, the signal adder circuit carries out, repeatedly and alternately with respect to the column direction, (i) additions for one row in which signals outputted from the photoelectric conversion elements are added up in each of the unit grids, using the first pattern and the third pattern repeatedly and alternately with respect to the row direction, and (ii) additions for another row in which signals outputted from the photoelectric conversion elements are added up in each of the unit grids, using the second pattern and the first pattern repeatedly and alternately with respect to the row direction. In this structure, additions in accordance with the first pattern and additions in accordance with the third pattern are carried out repeatedly and alternately with respect to the row direction, and thereby a first row of the first digital image signal and a first row of second digital image signal are produced. Meanwhile, additions in accordance with the second pattern and additions in accordance with the first pattern are carried out repeatedly and alternately with respect to the row direction, and thereby a second row of first digital image signal and a second row of the second digital image signal are produced. Further, these two types of additions are repeatedly carried out in the column direction, and thereby the whole rows of the first digital image signal and the whole rows of the second digital image signal are produced.

Further, the imaging element of Claim 2 may have a structure such that, as described in Claim 4, the signal adder circuit carries out, repeatedly and alternately with respect to the column direction, (i) additions for one row in which signals outputted from the photoelectric conversion elements are added up in each of the unit grids, using the first pattern and the second pattern repeatedly and alternately with respect to the row direction, and (ii) additions for another row in which signals outputted from the photoelectric conversion elements are added up in each of the unit grids, using the second pattern and the first pattern repeatedly and alternately with respect to the row direction. In this structure, the whole rows of the first digital image signal and the whole rows of the second digital image signal are produced, in a manner different from that of the structure of Claim 3.

Further, the imaging element of Claim 2 may have a structure such that, as described in Claim 5, the signal adder circuit carries out, repeatedly and alternately with respect to the column direction, (i) additions for one row in which signals outputted from the photoelectric conversion elements are added up in each of the unit grids, using the first pattern and the third pattern repeatedly and alternately with respect to the row direction, and (ii) additions for another row in which signals outputted from the photoelectric conversion elements are added up in each of the unit grids, using the third pattern and the first pattern repeatedly and alternately with respect to the row direction. In this structure, the whole rows of the first digital image signal and the whole rows of the second digital image signal are produced, in a manner different from that of the structure of Claim 4 and that of the structure of Claim 5.

Further, the imaging element of Claim 2 may have a structure such that: as described in Claim 6, the signal adder circuit executes repeatedly and alternately first-type addition processing and second-type addition processing, which are different in a placement order of the first to the third patterns, so that a type of addition processing is different between two successive frames; in the first-type addition processing, the signal adder circuit carries out, repeatedly and alternately with respect to the column direction, (i) additions for one row in which signals outputted from the photoelectric conversion elements are added up in each of the unit grids, using the first pattern and the third pattern repeatedly and alternately with respect to the row direction, and (ii) additions for another row in which signals outputted from the photoelectric conversion elements are added up in each of the unit grids, using the second pattern and the first pattern repeatedly and alternately with respect to the row direction; and in the second-type addition processing, the signal adder circuit carries out, repeatedly and alternately with respect to the column direction, (i) additions for one row in which signals outputted from the photoelectric conversion elements are added up in each of the unit grids, using the first pattern and the second pattern repeatedly and alternately with respect to the row direction, and (ii) additions for another row in which signals outputted from the photoelectric conversion elements are added up in each of the unit grids, using the third pattern and the first pattern repeatedly and alternately with respect to the row direction. In this structure, two types of addition processing, which are different in the placement order of the addition patterns, yield two pairs of the first and second digital image signals. Between the two pairs of digital image signals, there is an inversion in phase of false color signals, and an occurrence of false color is prevented by taking an average of the inverted signals.

Further, the imaging element of any one of Claims 1 to 6 may have a structure such that, as described in Claim 7, the signal adder circuit has transfer transistors which are provided for the respective photoelectric conversion elements, and transfer electrical charges generated by the respective photoelectric conversion elements, and the signal adder circuit is configured so that electrical charges are transferred at the same time from two transfer transistors to a floating diffusion which is shared among four transfer transistors corresponding to each one of the unit grids. This adopts a basic structure that each one floating diffusion is shared among four pixels, and therefore it is possible to use an already-existing pixel structure for realizing downsizing. Various addition patterns are implemented by making alterations to a manner of transfer.

Further, the imaging element of Claim 7 may have a structure such that: as described in Claim 8, eight transfer control signal lines which transmit transfer control signals to the transfer transistors are provided for each row of the unit grids; and four lines out of the eight transfer control signal lines are commonly used by every second unit grid aligned in the row direction, for four transfer transistors in each unit grid. In this structure, the four transfer control signal lines commonly used by every second unit grid aligned in the row direction are used to control the transfer transistor in each of these unit grids, and the other four transfer control signal lines are used to control the transfer transistor in each of the remaining unit grids. This enables transfer control to be performed variously differently between unit grids adjacent to each other, and it is possible to use various addition patterns, which are different from each other between unit grids adjacent to each other.

Further, the imaging element of Claim 7 may have a structure such that: as described in Claim 9, four transfer control signal lines which transmit transfer control signals to the transfer transistors are provided for each row of the unit grids; and the four transfer control signal lines are commonly used by two unit grids adjacent to each other in the row direction so that two of the four lines interchange with each other in one of the two unit grids. In this structure, since four transfer transistors are commonly used by each row of the unit grids, the number of transfer control signal lines is smaller. In addition, since the two transfer control signal lines are commonly used between two unit grids adjacent to each other so that these lines interchange with each other in one of the two unit grids, the combination of transfer transistors used for additions is different between the adjacent unit grids.

Further, the imaging element of Claim 2 may be, as described in Claim 10, adapted to interlaced output constituted by odd-field output for odd lines and even-field output for even lines, which are repeated alternately, and may have a structure such that: the signal adder circuit carries out, repeatedly and alternately with respect to the column direction, (i) additions for one row in which signals outputted from the photoelectric conversion elements are added up in each of the unit grids, using the first pattern and the third pattern repeatedly and alternately with respect to the row direction, and (ii) additions for another row in which signals outputted from the photoelectric conversion elements are added up in each of the unit grids, using the first pattern and the second pattern repeatedly and alternately with respect to the row direction, and then the signal adder circuit adds up signals of a same color adjacent to each other in the column direction and outputs obtained signals as the odd-field output; and the signal adder circuit carries out, repeatedly and alternately with respect to the column direction, (i) additions for one row in which signals outputted from the photoelectric conversion elements are added up in each of the unit grids, using the third pattern and the first pattern repeatedly and alternately with respect to the row direction, and (ii) additions for another row in which signals outputted from the photoelectric conversion elements are added up in each of the unit grids, using the first pattern and the second pattern repeatedly and alternately with respect to the row direction, and then the signal adder circuit adds up signals of a same color adjacent to each other in the column direction and outputs obtained signals as the even-field output. In this structure, the imaging element adapted to interlaced output is realized.

Further, a drive device of an imaging element of Claim 11 is a device which drives the imaging element including: a plurality of color filters arranged in a Bayer array where two-row-by-two-column unit grids of primary colors of R (red), G (green), and B (blue) are arranged; photoelectric conversion elements provided for the respective color filters, each of which elements outputs an analog signal corresponding to an intensity of light having passed through an associated color filter; a signal adder circuit which carries out additions of signals outputted from the photoelectric conversion elements, and outputs analog signals respectively corresponding to results of the additions; and an A/D converter which converts the signals outputted from the signal adder circuit to digital signals and then outputs the digital signals, in which the drive device controls the signal adder circuit so that the signals outputted from the signal adder circuit result from (i) addition of signals outputted from two photoelectric conversion elements corresponding to two color filters out of four color filters in each of the unit grids, and (ii) addition of signals outputted from two photoelectric conversion elements corresponding to remaining two color filters in each of the unit grids, and in which the drive device causes the imaging element to output: (i) a first digital image signal where signals of one color out of Ye (yellow) and Cy (cyan), and signals of G are alternately placed; and (ii) a second digital image signal where signals of an other color out of Ye and Cy, which is different from the one color, and signals of Mg (magenta) are alternately placed, based on the signals outputted from the signal adder circuit. Thus, realized is the drive device which causes the imaging element to function in the same way as the imaging element of Claim 1.

Further, a method of driving an imaging element of Claim 12 is a method of driving the imaging element including: a plurality of color filters arranged in a Bayer array where two-row-by-two-column unit grids of primary colors of R (red), G (green), and B (blue) are arranged; photoelectric conversion elements provided for the respective color filters, each of which elements outputs an analog signal corresponding to an intensity of light having passed through an associated color filter; a signal adder circuit which carries out additions of signals outputted from the photoelectric conversion elements, and outputs analog signals respectively corresponding to results of the additions; and an A/D converter which converts the signals outputted from the signal adder circuit to digital signals and then outputs the digital signals, the method including: controlling the signal adder circuit so that the signals outputted from the signal adder circuit are resulted from (i) addition of signals outputted from two photoelectric conversion elements corresponding to two color filters out of four color filters in each of the unit grids, and (ii) addition of signals outputted from two photoelectric conversion elements corresponding to remaining two color filters in each of the unit grids; and causing the imaging element to output: (i) a first digital image signal where signals of one color out of Ye (yellow) and Cy (cyan), and signals of G are alternately placed; and (ii) a second digital image signal where signals of an other color out of Ye and Cy, which is different from the one color, and signals of Mg (magenta) are alternately placed, based on the signals outputted from the signal adder circuit. Thus, realized is the method of driving the imaging element to function in the same way as the imaging element of Claim 1.

Further, an image processing device of Claim 13 includes: brightness signal generating means which generates brightness signals by carrying out addition of a signal for each pixel in the first digital image signal plus a signal for a corresponding pixel in the second digital image signal, the first and second digital image signals being outputted from the imaging element according to any one of Claims 1 to 10; color difference signal generating means which generates color difference signals by carrying out subtraction between a signal for each pixel in the first digital image signal and a signal for a corresponding pixel in the second digital image signal; and image data generating means which generates image data having RGB color component values determined for each pixel, based on the brightness signals generated by the brightness signal generating means and the color difference signals generated by the color difference signal generating means. In this structure, since the brightness signals are generated by adding a signal for each pixel in the first digital image signal to a signal for a corresponding pixel in the second digital image signal, sensitivity in generating the brightness signals is improved. In addition, since the brightness signal is generated for every pixel, by adding a signal for each pixel in the first digital image signal to a signal for a corresponding pixel in the second digital image signal, without interpolation, a high-resolution image is formed.

Further, the image processing device of Claim 13 may have a structure such that, as described in Claim 14, the color difference signal generating means generates the color difference signals by performing interpolation, using a low-pass filter, on a result obtained from the subtraction between a signal for each pixel in the first digital image signal and a signal for a corresponding pixel in the second digital image signal. In this structure, interpolation of the color difference signals is performed using the low-pass filter, and therefore an occurrence of false color is prevented.

Further, an image processing device of Claim 15 includes: a plurality of color filters arranged in a Bayer array where two-row-by-two-column unit grids of primary colors of R (red), G (green), and B (blue) are arranged; pixel signal generating means which generates pixel signals for the respective color filters, each of which signals indicates an intensity of light having passed through a corresponding color filter; and signal adder means which executes processing such that, in each of the unit grids, (i) signals outputted from two photoelectric conversion elements corresponding to two color filters out of four color filters are added up, and (ii) signals outputted from two photoelectric conversion elements corresponding to remaining two color filters are added up, and then outputs signals corresponding to respective results of additions, in which the image processing device generates: (i) a first digital image signal where signals of one color out of Ye (yellow) and Cy (cyan), and signals of G are alternately placed; and (ii) a second digital image signal where signals of an other color out of Ye and Cy, which is different from the one color, and signals of Mg (magenta) are alternately placed, based on the signals outputted from the signal adder means. In this structure, two pixel signals are added up in each unit grid, so the number of sampled signals is limited, and this leads to a decrease in operation speed or power consumption needed for readout of pixel signals. Further, pixel signals are not decimated, but are added up and then outputted, so readout sensitivity is improved. Furthermore, when brightness signals are generated by adding up signals of the first digital image signal and the second digital image signal which are thus generated, each brightness signal is generated by adding up two pixel signals, and therefore the sensitivity is further improved.

Further, a program of Claim 16, is a program for causing a computer to execute the following steps of: a brightness signal generating step of generating brightness signals by carrying out addition of a signal for each pixel in the first digital image signal plus a signal for a corresponding pixel in the second digital image signal, the first and second digital image signals being outputted from the imaging element according to any one of Claims 1 to 10; a color difference signal generating step of generating color difference signals by carrying out subtraction between a signal for each pixel in the first digital image signal and a signal for a corresponding pixel in the second digital image signal; and an image data generating step of generating image data having RGB color component values determined for each pixel, based on the brightness signals generated by the brightness signal generating means and the color difference signals generated by the color difference signal generating means.

Further, the program of Claim 16 may have a structure such that, as described in Claim 17, in the color difference signal generating step, the color difference signals are generated by performing interpolation, using a low-pass filter, on a result obtained from the subtraction between a signal for each pixel in the first digital image signal and a signal for a corresponding pixel in the second digital image signal.

Further, an imaging device of Claim 18 includes: an image capture optical system which forms a subject image; the imaging element according to any one of Claims 1 to 10, which carries out photoelectric conversion on the subject image formed by the image capture optical system into signals and outputs the signals; and an image processing device which performs predetermined signal processing on the signals outputted from the imaging element to reproduce the subject image. This makes it possible to reproduce a high-quality subject image, based on the first and second digital image signals outputted from the imaging element.

Advantageous Effects of Invention

In the imaging element of Claim 1, signals outputted from two photoelectric conversion elements are added up and then read out in each unit grid, so the number of pixel signals read out per frame is decreased. In the case where a frame rate is fixed for example, this causes a reduction in an operating frequency and/or an A/D conversion rate in the imaging element, leading to a reduction in power consumption. On the other hand, in the case where the operating frequency and the A/D conversion rate are fixed, an increase in the frame rate is possible. Since pixel signals adjacent to each other in each unit grid are added up, there is no difficulty in construction of a pixel structure. Further, pixel signals are not decimated, but are added up and outputted, so this improves its sensitivity in readout of pixel signals. Furthermore, when brightness signals are generated by adding up signals of the first digital image signal and the second digital image signal which are outputted from the imaging element of the present invention, each brightness signal is generated by adding up two pixel signals, and therefore the sensitivity is further improved.

Further, the brightness signals are generated from the first digital image signal and the second digital image signal outputted from the imaging element of Claim 1, just by adding up respective pixel signals of the first and second digital image signals, for each pixel. Since spatial interpolation is not needed when generating the brightness signals, it is possible to obtain a high-resolution image.

BRIEF DESCRIPTION OF DRAWINGS

FIG. 9(a) to FIG. 9(j) are schematic diagrams illustrating arrangements of addition patterns related to a third embodiment, and image signals generated in accordance with the arrangements of addition patterns.

FIG. 10(a) to FIG. 10(d) are schematic diagrams illustrating arrangements of addition patterns related to fourth and fifth embodiments.

DESCRIPTION OF EMBODIMENTS

First Embodiment

The following describes a first embodiment, which is one of embodiments related to the present invention, with reference to the drawings.

Figure 1:
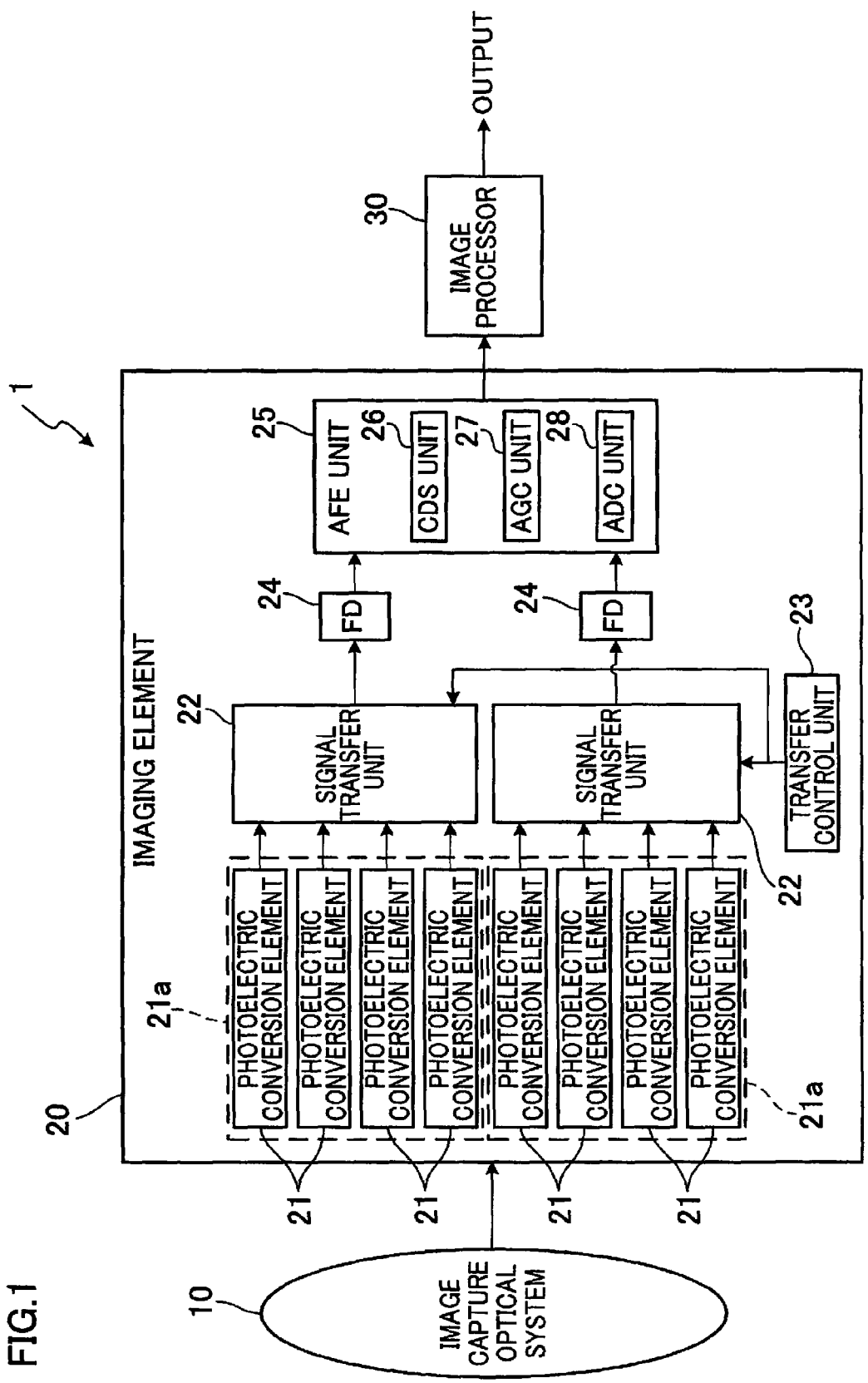
FIG. 1 is a block diagram illustrating a structure of an imaging device related to a first embodiment, which is one embodiment of the present invention.

FIG. 1 is a block diagram illustrating a structure of an imaging device 1 related to the first embodiment, which is one embodiment of the present invention. As shown in FIG. 1, the imaging device 1 is constituted by: an image capture optical system 10 which introduces light and forms a subject image on an imaging element 20; the imaging element 20 which carries out photoelectric conversion on the formed subject image into signals and outputs the signals; and an image processor 30 which performs predetermined signal processing on the signals outputted from the imaging element 20 to reproduce the subject image. Still image data is generated from image data for an image of one frame outputted from the image processor 30, while moving image data is generated from image data for images of multiple frames outputted successively, in terms of time, from the image processor 30.

The imaging element 20 includes: a plurality of photoelectric conversion elements 21 which output analog signals in accordance with amounts of light received; floating diffusions (hereinafter referred to as "FDs") 24 each of which is shared among a set of the photoelectric conversion elements 21; signal transfer units 22 which transfer the analog signals outputted from the photoelectric conversion elements 21 to the FDs 24; a transfer control unit 23 which controls the transfer of the analog signals carried out by the signal transfer units 22; and an AFE (Analog Front End) unit 25 which converts the analog signals outputted from the FDs 24 to digital signals and outputs the digital signals.

The plurality of photoelectric conversion elements 21 are respectively provided with color filters. Each of these color filters corresponds to any of the primary colors of R (red), G (green), and B (blue). The plurality of color filters are arranged in a Bayer array where two-row-by-two-column unit grids of primary colors of R, G, and B are arranged. Light emitted from a subject image formed by the image capture optical system 10 passes through the different colors of color filters, from each of which light of one particular color is outputted, and the outputted light is received by a corresponding photoelectric conversion element 21. Each photoelectric conversion element 21 outputs, in a form of an analog electrical signal, electrical charge whose amount corresponds to an intensity of the light of the particular color outputted from its color filter. Thus, the imaging element 20 is constructed as a single-chip imaging element. In this embodiment, the photoelectric conversion elements 21 are arranged in a matrix of 4000 (in a horizontal direction) by 3000 (in a vertical direction). That is, the imaging element 20 has 12 megapixels constituted by horizontal 4000 pixels by vertical 3000 pixels.

Figure 2:
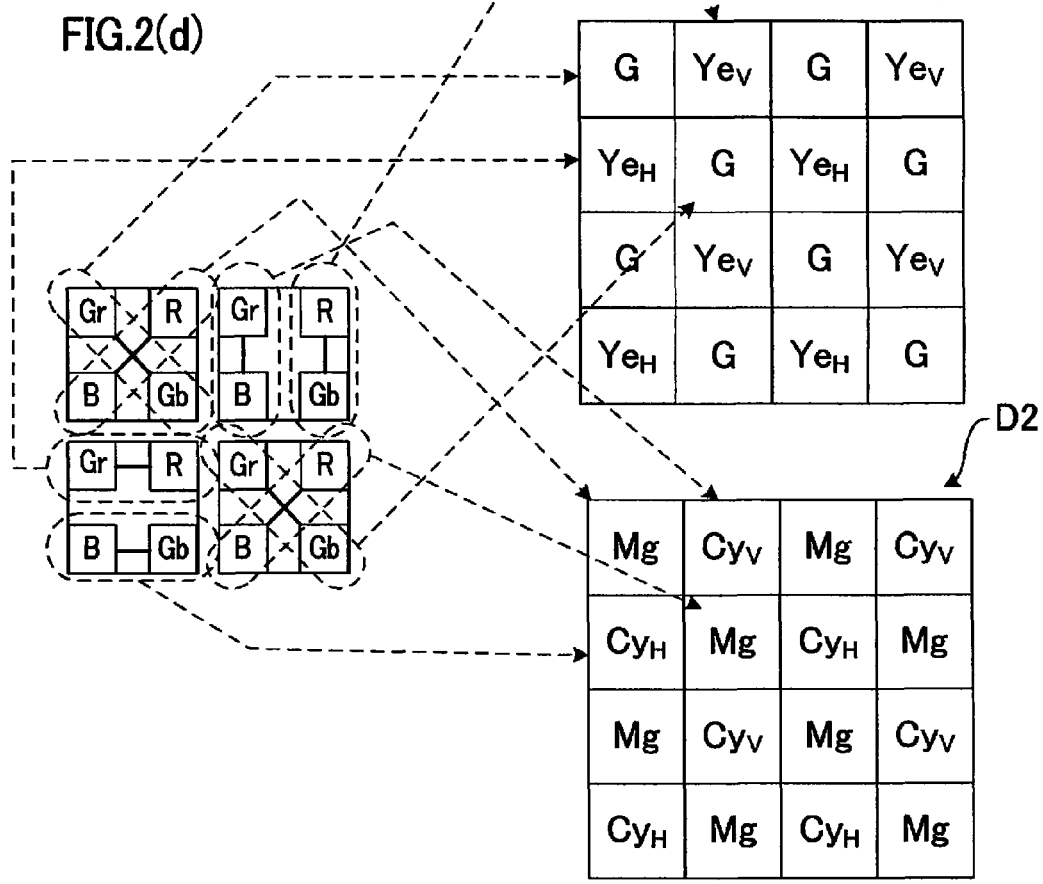
FIG. 2(a) is a schematic diagram illustrating a Bayer array.
FIG. 2(b) is a schematic diagram illustrating addition patterns of pixel signals.
FIG. 2(c) is a schematic diagram illustrating one example of arrangement of the addition patterns.
FIG. 2(d) is a schematic diagram illustrating how to arrange results obtained from additions in accordance with the arrangement of the addition patterns shown in FIG. 2(c).

FIG. 2(a) illustrates the above-mentioned Bayer array. The color filters arranged in the Bayer array are constituted of: rows in each of which G filters and R filters are placed alternately in a row direction; and rows in each of which G filters and B filters are placed alternately in the row direction, and these two types of rows are placed alternately in a column direction. Of these, the G filters are placed in a checkerboard pattern. In this embodiment, G adjacent to R in the row direction is termed Gr, and G adjacent to B in the row direction is termed Gb.

The electrical charges outputted from the photoelectric conversion elements 21 are transferred by the signal transfer units 22 to the FDs 24. The transfer control unit 23 controls (i) timing of such transfer and (ii) from which of the photoelectric conversion elements 21 their electrical charges are transferred by the signal transfer units 22 to the FDs 24. Thus, in the imaging element 20, it is possible for electrical charges to be transferred from all the photoelectric conversion elements 21 to the FDs 24 in one frame, and also it is possible for electrical charges to be transferred from some of the photoelectric conversion elements 21 to the corresponding FDs 24 in one frame.

Each FD 24 outputs a voltage corresponding to an amount of electrical charges transferred from the associated photoelectric conversion elements 21. Each FD 24 is shared among a plurality of photoelectric conversion elements 21. To be more specific, each one FD 24 is shared among four photoelectric conversion elements 21, which correspond to the two-row-by-two-column unit grid in the Bayer array ("Bayer unit grid") and collectively form a photoelectric conversion element group 21a. In FIG. 1, each photoelectric conversion element group 21a is encircled with a broken line. In FIG. 2(a), the two-row-by-two-column unit grids respectively corresponding to the photoelectric conversion element groups 21a are encircled with broken lines. Each FD 24 generates a voltage signal corresponding to the amount of electrical charges transferred from the associated photoelectric conversion elements 21, and outputs the signal to the AFE unit 25.

The AFE unit 25 has: a CDS (Correlated Double Sampling) unit 26 which carries out correlated double sampling on analog signals outputted from the FDs 24; an AGC (Automatic Gain Control) unit 27 which amplifies the analog signals on which the correlated double sampling has been carried out by the CDS unit 26; and an ADC unit 28 (A/D converter) which converts the analog signals amplified by the AGC unit 27 to digital image signals. Analog signals outputted from the FDs 24 are converted to digital signals by the AFE unit 25, and then outputted to the image processor 30.

As described above, the imaging element 20 outputs digital image signals for an image whose number of pixels corresponding to the number of photoelectric conversion elements 21, per frame, from which electrical charges are transferred by the signal transfer units 22 to the FDs 24/. When capturing a high-definition still image, the imaging element 20 outputs, per frame, digital image signals for an image of 12 megapixels, in which case electrical charges are transferred from all the photoelectric conversion elements 21. On the other hand, when capturing an HD moving image of horizontal 1920 pixels by vertical 1080 pixels, the imaging element 20 only outputs, per frame, signals for an image of 2.1 megapixels, which is less than 12 megapixels. One idea to deal with this is that, for example, the number of photoelectric conversion elements 21 from which electrical charges are transferred by the signal transfer units 22 to the FDs 24 is decreased to the number corresponding to the 2.1-megapixel image. However, if the number of photoelectric conversion elements 21 from which electrical charges are transferred is decreased from the number corresponding to the 12-megapixel image to the number corresponding to the 2.1-megapixel image, generated are a large amount of pixel signals which are not read out though the photoelectric conversion elements 21 have received light corresponding thereto. Such a simple idea, which results in generation of pixel signals which are not read out, causes desensitization in digital image signals outputted from the imaging element 20, and this is not preferable.

Therefore, the imaging element 20 of this embodiment does not employ such a simple structure that the number of photoelectric conversion elements 21 from which electrical charges are transferred by the signal transfer units 22 to the FDs 24 is decreased, but is structured so as to output digital image signals for an image of smaller number of pixels by adding up of pixel signals, as described below.

The transfer control unit 23 controls each signal transfer unit 22 so that electrical charges are transferred at the same time from a plurality of photoelectric conversion elements 21 to the associated FD 24. Amounts of electrical charges transferred to the FD 24 at the same time are added up in the FD 24. The FD 24 outputs, to the AFE unit 25, a voltage corresponding to an amount of electrical charge obtained from the addition. Thus, each signal transfer unit 22 and its FD 24 function as a signal adder circuit which adds up signals outputted from a plurality of photoelectric conversion elements 21 and outputs a voltage signal corresponding to a result of the addition. Since each FD 24 is shared by the associated photoelectric conversion element group 21a constituted of four photoelectric conversion elements 21 which correspond to the two-row-by-two-column Bayer unit grid, the imaging element 20 is structured so that pixel signals are added up within each photoelectric conversion element group 21a.

FIG. 2(b) illustrates three addition patterns, each of which is an example showing how pixel signals are added up within each photoelectric conversion element group 21a. In each of the addition patterns 1X, 2H, and 2V of FIG. 2(b), signals respectively outputted from two photoelectric conversion elements 21 included in one photoelectric conversion element group 21a are added up, and signals outputted from the remaining two photoelectric conversion elements 21 in the group are added up.

To be more specific, according to the addition pattern 1X (a first pattern), signals from two photoelectric conversion elements 21 respectively corresponding to Gr and Gb placed obliquely relative to each other are added up; and signals from two photoelectric conversion elements 21 respectively corresponding to R and B placed obliquely relative to each other are added up, within one photoelectric conversion element group 21a. According to the addition pattern 2H (a second pattern), signals from two photoelectric conversion elements 21 respectively corresponding to Gr and R aligned in the row direction are added up; and signals from two photoelectric conversion elements 21 respectively corresponding to B and Gb aligned in the row direction are added up, within one photoelectric conversion element group 21a. According to the addition pattern 2V (a third pattern), signals from two photoelectric conversion elements 21 respectively corresponding to Gr and B aligned in the column direction are added up, and signals from two photoelectric conversion elements 21 corresponding to R and Gb aligned in the column direction are added up.

FIG. 2(c) illustrates an example of arrangement of the addition patterns 1X, 2H, and 2V. In the arrangement of FIG. 2(c), its first row has the addition patterns 1X and the addition patterns 2V placed repeatedly and alternately, and its second row has the addition patterns 2H and the addition patterns 1X placed repeatedly and alternately. The first rows and the second rows in each of which the addition patterns are thus arranged are placed repeatedly and alternately in the column direction.

In accordance with the addition pattern 1X, as a result of addition of Gr plus Gb, a signal indicating G color is generated, and as a result of addition of R plus B, a signal indicating Mg (magenta) color is generated. In accordance with the addition pattern 2H, as a result of addition of Gr plus R, a signal indicating Ye (yellow) color is generated, and as a result of addition of B plus Gb, a signal indicating Cy (cyan) color is generated. In accordance with the addition pattern 2V, as a result of addition of Gr plus B, a signal indicating Cy color is generated, and as a result of addition of R plus Gb, a signal indicating Ye color is generated. Note that, in order to discriminate between the results of additions in accordance with the addition pattern 2H and the results of additions in accordance with the addition pattern 2V, hereinafter, the colors of signals resulting from the additions in accordance with the addition pattern 2H are described as $Ye_H$ and $Cy_H$; and the colors of signals resulting from the additions in accordance with the addition pattern 2V are described as $Ye_V$ and $Cy_V$.

When, out of the signals resulting from the additions in accordance with the addition patterns 1X, 2H, and 2V, the signals indicating G color and the signals indicating Ye color are arranged in accordance with a manner shown in FIG. 2(c), a digital image signal D1 shown in FIG. 2(d) is generated. On the other hand, when, out of the signals generated resulting from the additions in accordance with the addition patterns 1X, 2H, and 2V, the signals indicating Mg color and the signals indicating Cy color are arranged in accordance with the manner shown in FIG. 2(c), a digital image signal D2 shown in FIG. 2(d) is generated. Broken-line arrows in FIG. 2(d) show how to arrange eight signals resulting from additions in accordance with four addition patterns arranged in a matrix of two rows by two columns where the addition pattern 1X is located at its upper left portion (as shown in FIG. 2(c)), to form the digital image signals D1 and D2.

The transfer control unit 23 controls the signal transfer units 22 to transfer electrical charges from the photoelectric conversion elements 21 to the FDs 24 so that pixel signals are added up in accordance with the arrangement of the addition patterns shown in FIG. 2(c). That is, the transfer control unit 23 controls each signal transfer unit 22 to transfer electrical charges from the photoelectric conversion elements 21 in the corresponding photoelectric conversion element group 21a to the associated FD 24 so that: pixel signals are added up within each photoelectric conversion element group 21a in accordance with any of the addition patterns 1X, 2H, and 2V; and the addition pattern to be used is determined in accordance with the arrangement shown in FIG. 2(c). Based on the pixel signals resulting from the additions outputted from the FDs 24, the AFE unit 25 then outputs the digital image signals D1 and D2 shown in FIG. 2(d) to the image processor 30. In this embodiment, the two digital image signals constituted by the digital image signal D1 and the digital image signal D2 are collectively referred to as a "two-surface complementary color Bayer pattern".

Figure 3:
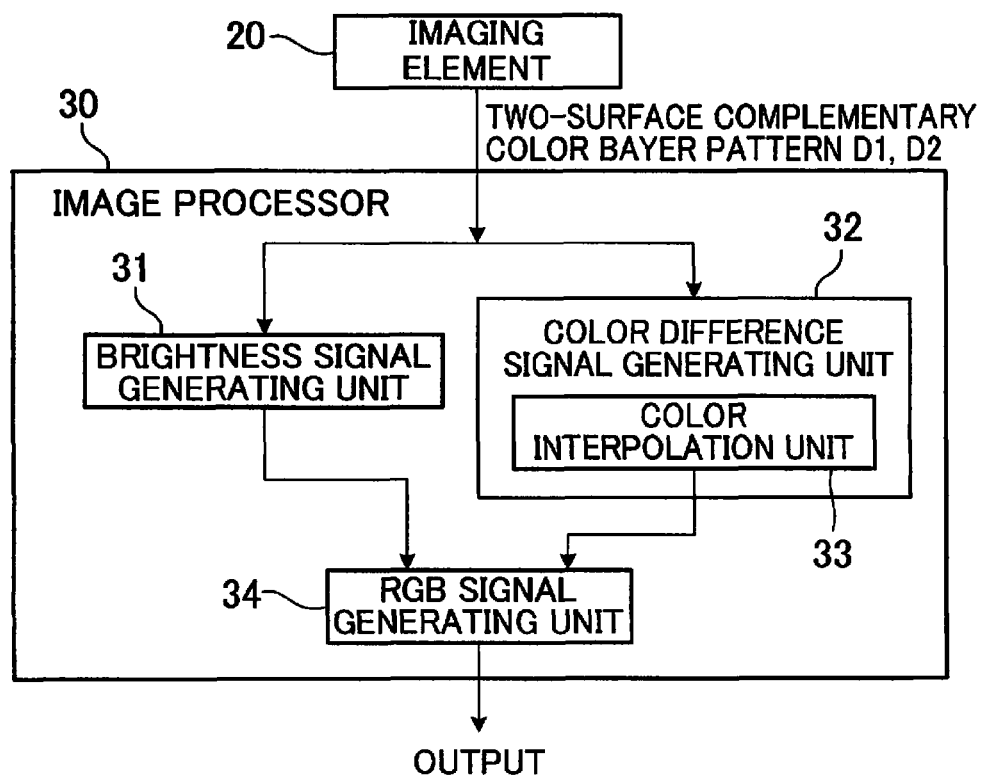
FIG. 3 is a block diagram illustrating a structure of an image processor.

The following describes the image processor 30 which conducts predetermined signal processing on the digital image signals D1 and D2 of the two-surface complementary color Bayer pattern outputted from the imaging element 20. FIG. 3 is a block diagram illustrating a structure of the image processor 30. The image processor 30 has: a brightness signal generating unit 31 which generates brightness signals Y from the digital image signals D1 and D2; a color difference signal generating unit 32 which generates color difference signals C1 and C2 from the digital image signals D1 and D2; and an RGB signal generating unit 34 which generates an image data having RGB three color component values determined for each pixel, from the brightness signals Y generated by the brightness signal generating unit 31 and the color difference signals C1 and C2 generated by the color difference signal generating unit 32. The image processor 30 is constituted by various types of hardware such as a CPU (Central Processing Unit), a ROM (Read Only Memory), and the like, and software such as programs stored in the ROM and the like. The software causes the hardware to function as the brightness signal generating unit 31, the color difference signal generating unit 32, and the RGB signal generating unit 34, and thereby the image processor 30 is implemented.

Figure 4:
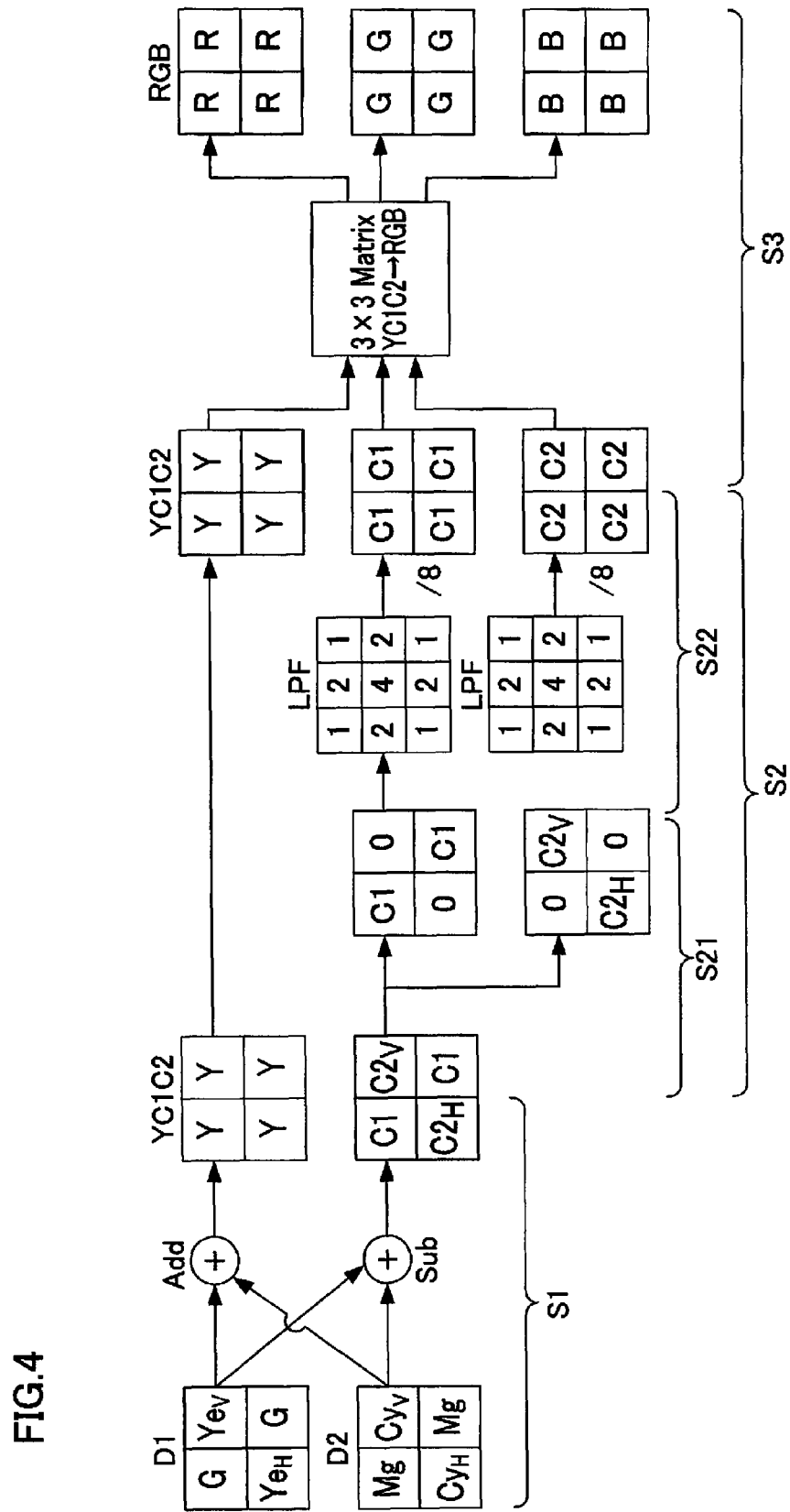
FIG. 4 is a schematic diagram illustrating steps of signal processing executed by the image processor.

FIG. 4 is a schematic diagram sequentially illustrating steps of signal processing executed by the image processor 30. First, as shown in a step S1, the brightness signal generating unit 31 adds each pixel signal of the digital image signal D1 to a corresponding pixel signal of the digital image signal D2. That is, the brightness signal generating unit 31 adds up each of pairs of pixel signals, each pair being constituted of a pixel signal of D1 and a pixel signal of D2 which are at a same position with each other. Thus, each G pixel signal of D1 and a corresponding Mg pixel signal of D2 are added up, and each Ye pixel signal of D1 and a corresponding Cy pixel signal of D2 are added up.

That is, the brightness signal generating unit 31 executes addition processing represented by: $Y=(G+Mg)/2$; and $Y=(Ye+Cy)/2$. Note that, the brightness signal generating unit 31 takes an average by dividing each result of addition by 2. The G pixel signal has been obtained from the addition of Gr plus Gb, and the Mg pixel signal indicating has been obtained from the addition of R plus B. Accordingly, a brightness signal obtained from the addition of G plus Mg is represented by: $Y=(G+Mg)/2=(Gr+R+B+Gb)/4$. This is based on an assumption that each result of addition (such as (Gr+Gb)) carried out in the imaging element 20 has been divided by 2 to take an average. Meanwhile, the Ye pixel signal has been obtained from the addition of R plus Gr or Gb, and the Cy pixel signal has been obtained from the addition of B plus Gb or Gr. Accordingly, a brightness signal obtained from the addition of Ye plus Cy is represented by: $Y=(Ye+Cy)/2=(Gr+R+B+Gb)/4$. This is based on an assumption that each result of addition (such as (R+Gr)) carried out in the imaging element 20 has been divided by 2 to take an average. Through the above-described processing, the brightness signal Y is obtained for every sampling position.

On the other hand, as shown in the step S1, the color difference signal generating unit 32 subtracts each pixel signal of the digital image signal D2 from a corresponding pixel signal of the digital image signal D1. The color difference signal generating unit 32 carries out subtraction between each of pairs of pixel signals, each pair being constituted of a pixel signal of D1 and a pixel signal of D2 which are at a same position with each other. Accordingly, each Mg pixel signal of D2 is subtracted from the corresponding G pixel signal of D1, and each Cy pixel signal of D2 is subtracted from the corresponding Ye pixel signal of D1.

That is, the color difference signal generating unit 32 executes subtraction processing represented by: $C1=(G-Mg)/2$; $C2_H=(Ye_H-Cy_H)/2$; and $C2_V=(Ye_V-Cy_V)/2$. Note that, the color difference signal generating unit 32 takes an average by dividing each result of addition by 2. In the above equations, a color difference signal obtained from $Ye_H$ and $Cy_H$ is described as $C2_H$, and a color difference signal obtained from $Ye_V$ and $Cy_V$ is described as $C2_V$. Here, the G pixel signal has been obtained from the addition of Gr plus Gb, and the Mg pixel signal has been obtained from the addition of R plus B. Accordingly, a color difference signal obtained from the subtraction of Mg from G is represented by $C1=(G-Mg)/2=((Gr+Gb)-(R+B))/4$. Note that, this is based on an assumption that each result of addition (such as (Gr+Gb)) carried out in the imaging element 20 has been divided by 2 to take an average. Meanwhile, the Ye pixel signal has been obtained from the addition of R plus Gr or Gb, and the Cy pixel signal has been obtained from the addition of B plus Gb or Gr. Accordingly, a color difference signal obtained from the subtraction of Cy from Ye is represented by: $C2_H=(Ye_H-Cy_H)/2=((Gr-Gb)+(R-B))/4$; or $C2_V=(Ye_V-Cy_V)/2=((Gb-Gr)+(R-B))/4$. Note that, this is based on an assumption that each result of addition (such as (R+Gr)) carried out in the imaging element 20 has been divided by 2 to take an average.

As shown in FIG. 4, the color difference signals thus generated in the step S1 are arranged in such a manner that the signals C1 and C2 are placed repeatedly and alternately in the row direction and the column direction. Therefore, the color interpolation unit 33 performs interpolation of the color difference signals, as shown in a step S2. First, as shown in a step S21, the color interpolation unit 33 divides the color difference signals which have been generated in the step S1 so that the color difference signals C1 are separated from the color difference signals C2, and performs upsampling on the color difference signals C1 and the color difference signals C2 separately, using "0" for each pixel having no signal. As shown in a step S22, the color interpolation unit 33 then filters the color difference signals C1 and the color difference signals C2, on which upsampling has been performed, with low-pass filters (LPF), respectively, to perform the interpolation. That is, the color interpolation unit 33 filters each color difference signals C1 with a filter of three rows by three columns constituted by a first row of (1, 2, 1), a second row of (2, 4, 2), and a third row of (1, 2, 1), and then divides every result by 8 to take an average. Further, the color interpolation unit 33 filters each pixel signal of the color difference signals C2 with a filter similar to the above, and then divides whole result by 8 to take an average. Thus, the low-pass filters are used for interpolation of pixel signals, and this decreases a possibility that false color signals are included in the color difference signals obtained after the interpolation.

Through the step S1 and the step S2, the brightness signal Y and the color difference signals C1 and C2 are obtained for every sampling position. As shown in a step S3, the RGB signal generating unit 34 performs three-row-by-three-column matrix operation on the brightness signals Y and the color difference signals C1 and C2, which have been obtained through the step S1 and the step S2, and thereby produces signals of RGB color component values for each pixel. The three-row-by-three-column matrix operation is represented by: R=Y−C1+2*C2; G=Y+C1; and B=Y−C1−2*C2.

As described above, in this embodiment, the imaging element 20 first generates the two-surface complementary color Bayer pattern based on an image formed by Bayer-arranged R, G, and B pixel signals. At this time, as shown in FIG. 2(d), a two-surface complementary color Bayer pattern of two rows by two columns is generated from an image formed by Bayer-arranged pixel signals of four rows by four columns. Then, based on the two-surface complementary color Bayer pattern, the image processor 30 generates image data having RGB color component values determined for each pixel. At this time, from the two-row-by-two-column two-surface complementary color Bayer pattern, generated is the two-row-by-two-column image data having the RGB color component values. That is, the imaging element 20 outputs the two-surface complementary color Bayer pattern whose vertical and horizontal sizes are respectively one-half of those of the image formed by Bayer-arranged R, G, and B pixel signals, and the image processor 30 outputs the image data having the RGB color component values for an image whose size is same as that of the two-surface complementary color Bayer pattern.

Therefore, when generating image data for an HD moving image of horizontal 1920 pixels by vertical 1080 pixels, first, the imaging element 20 generates a two-surface complementary color Bayer pattern from an image of horizontal 3840 pixels by vertical 2160 pixels out of an image formed by Bayer-arranged RGB pixel signals of horizontal 4000 pixels by vertical 3000 pixels. As a result, generated is a two-surface complementary color Bayer pattern of horizontal 1920 pixels by vertical 1080 pixels. Then, based on the two-surface complementary color Bayer pattern outputted from the imaging element 20, the image processor 30 generates image data having RGB color component values determined for each pixel. As a result, the image data for the HD moving image of horizontal 1920 pixels by vertical 1080 pixels is outputted from the image processor 30.

Figure 5:
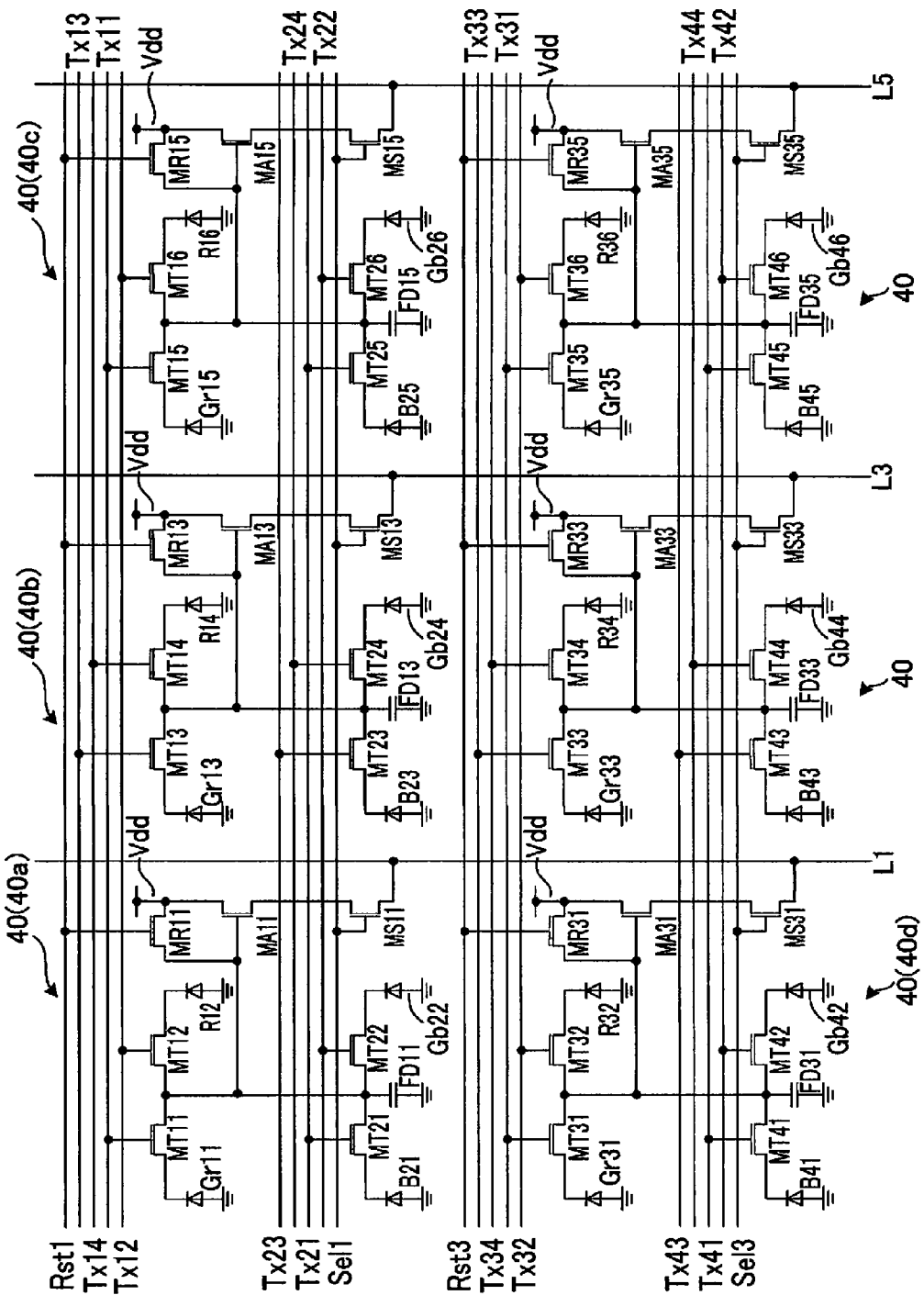
FIG. 5 is a diagram of a specific circuit structure for implementing the arrangement of the addition patterns shown in FIG. 2(c).

The following describes a specific circuit structure of the imaging element 20 capable of outputting the two-surface complementary color Bayer pattern and a method of driving the circuit. FIG. 5 is a diagram of the specific circuit structure for implementing the arrangement of the addition patterns shown in FIG. 2(c). FIG. 5 represents a circuit constituted of unit circuits 40 arranged in three (in the row direction) by two (in the column direction), each of which unit circuits corresponds to the Bayer unit grid. In practice, the circuit is structured in such a way that the unit circuits 40 shown in FIG. 5, together with their peripheral components, of which number corresponds to the total number of pixels of the imaging element 20 are arranged along the row direction and the column direction.

In FIG. 5, Gr11 to Gr35 represent photodiodes disposed below the Gr color filters; R12 to R36 represent photodiodes disposed below the R color filters; B21 to B45 represent photodiodes disposed below the B color filters; and Gb22 to Gb46 represent photodiodes disposed below the Gb color filters. FD11 to FD35 represent floating diffusions; MT11 to MT46 represent transfer transistors each of which transfers electrical charge from the associated photodiode to any one of the FD11 to FD35.

MA11 to MA35 represent amplifier transistors which amplify signals outputted from the respective FDs. MR11 to MR35 represent reset transistors which reset, in the photodiodes, electrical charges generated by photoelectric conversion ("photo-generated charges"). MS11 to MS35 represent row-selection transistors which are used for selecting unit circuits 40 from which pixel signals are outputted. L1 to L5 represent vertical output lines to which pixel signals are outputted from the unit circuits 40, and each Vdd represents a voltage supplied to the corresponding unit circuit 40. Tx11 to Tx44 represent transfer control signal lines which transmit transfer control signals to the transfer transistors, Rst1 and Rst3 represent reset control signal lines which transmit reset control signals to the reset transistors, and Sel1 and Sel3 represent row-selection control signal lines which transmit row-selection control signals to the row-selection transistors.

Each of the unit circuits 40 includes: four photodiodes corresponding to one photoelectric conversion element group 21a; and four transfer transistors corresponding to one signal transfer unit 22. Further, each unit circuit 40 includes: one FD, one amplifier transistor, one reset transistor, and one row-selection transistor. For example, the most upper-left unit circuit 40 presented in FIG. 5 (hereinafter referred to as a "unit circuit 40a") is constituted by: the photodiodes Gr11, R12, B21, and Gb22; the transfer transistors MT11, MT12, MT21, and MT22; the FD11; the amplifier transistor MA11; the reset transistor MR11; and the row-selection transistor MS11. For another example, the unit circuit 40 at the right of the unit circuit 40a (hereinafter referred to as a "unit circuit 40b") is constituted by: the photodiodes Gr13, R14, B23, and Gb24; the transfer transistors MT13, MT14, MT23, and MT24; the FD13; the amplifier transistor MA13; the reset transistor MR13; and the row-selection transistor MS13.

The unit circuits 40 have the same structure. For example, referring to the unit circuit 40a, an anode of the photodiode Gr11 is grounded, and its cathode is connected to the FD11 via the transfer transistor MT11. In the same way, anodes of the respective photodiodes R12, B21, and Gb22 are grounded, and their respective cathodes are connected to the transfer transistors MT12, MT21, and MT22, respectively. A gate of the transfer transistor MT11 is connected to the transfer control signal line Tx11. In the same way, gates of the transfer transistors MT12, MT21, and MT22 are connected to the transfer control signal lines Tx12, Tx21, and Tx22, respectively.

The FD11 is connected to a gate of the amplifier transistor MA11. The reset transistor MR11 is connected between a drain and the gate of the amplifier transistor MA11, and a source of the amplifier transistor MA11 is connected to the vertical output line L1 via the row-selection transistor MS11. A gate of the reset transistor MR11 is connected to the reset control signal line Rst1, and a gate of the row-selection transistor MS11 is connected to the row-selection control signal line Sel1. To the drain of the amplifier transistor MA11, the voltage Vdd is supplied.

In the circuit structure of FIG. 5, eight transfer control signal lines are provided for each row of the unit circuits 40 aligned in the row direction. Further, out of these eight lines, four transfer control signal lines are commonly used by every second unit circuit 40 aligned in the row direction. For example, in the row including the unit circuit 40a, eight transfer control signal lines Tx11 to Tx22 are commonly used by the unit circuits 40 of this row. Out of these eight lines, the transfer control signal line Tx11 is connected to the transfer transistor MT11 of the unit circuit 40a, and to the transfer transistor MT15 of a unit circuit 40 which is located at the right of the unit circuit 40b with the unit circuit 40b being interposed between the unit circuit 40a and that unit circuit 40 (hereinafter referred to as a "unit circuit 40c"). In the same way, the transfer control signal lines Tx12, Tx21, and Tx22 are connected to the transfer transistors MT12, MT21, and MT22 of the unit circuit 40a, respectively, and also connected to the transfer transistors MT16, MT25, and MT26 of the unit circuit 40c, respectively. Thus, out of the eight transfer control signal lines Tx11 to Tx22, the four transfer control signal lines Tx11, Tx12, Tx21, and Tx22 are commonly used by every second unit circuit 40 aligned in the row direction, as transfer control signal lines for four transfer transistors included in each of these unit circuits 40.

Meanwhile, in the unit circuit 40b at the right of the unit circuit 40a, the transfer control signal lines Tx13, Tx14, Tx23, and Tx24, which are remaining four lines out of the eight lines, are connected to the transfer transistors MT13, MT14, MT23, and MT24, respectively. These transfer control signal lines Tx13, Tx14, Tx23, and Tx24 are also respectively connected to four transfer transistors of another unit circuit 40 (not shown), which is located at the right of the unit circuit 40c with the unit circuit 40c being interposed between the unit circuit 40b and that another unit circuit 40. Thus, the four transfer control signal lines Tx13, Tx14, Tx23, and Tx24 are also commonly used by every other unit circuit 40 aligned in the row direction, as transfer control signal lines for four transfer transistors included in each of these unit circuits 40.

In the circuit structure of FIG. 5, one reset control signal line is provided for each row of the unit circuits 40 aligned in the row direction, and is connected to the reset transistors included in the respective unit circuits 40 of the corresponding row. For example, the reset control signal line Rst1 is connected to: the reset transistor MR11 of the unit circuit 40a; the reset transistor MR13 of the unit circuit 40b; and the reset transistor MR15 of the unit circuit 40c. In the same way, one row-selection control signal line is provided for each row of the unit circuits 40 aligned in the row direction, and is connected to the row-selection transistors included in the respective unit circuits 40 of the corresponding row. For example, the row-selection control signal line Sel1 is connected to: the row-selection transistor MS11 of the unit circuit 40a; the row-selection transistor MS13 of the unit circuit 40b; and the row-selection transistor MS15 of the unit circuit 40c.

Figure 6A:
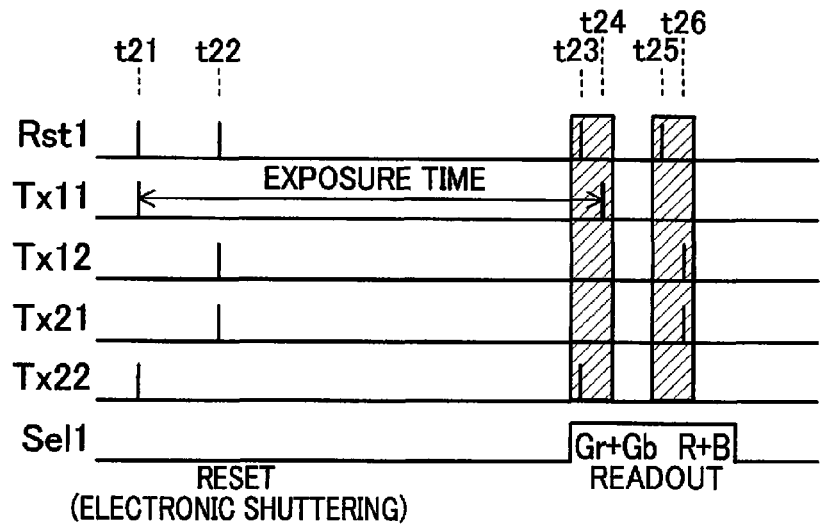
FIG. 6(a) to FIG. 6(c) are sequence diagrams, each illustrating transfer control signals applied through transfer control signal lines to transfer transistors in order to cause a unit circuit to output signals resulting from additions in accordance with corresponding one of the addition patterns shown in FIG. 2(b).
Figure 6B:
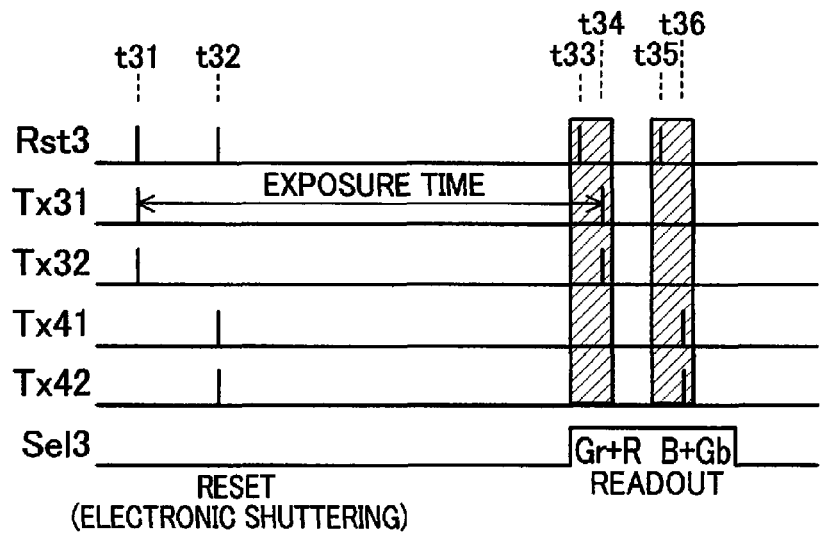
Figure 6C:
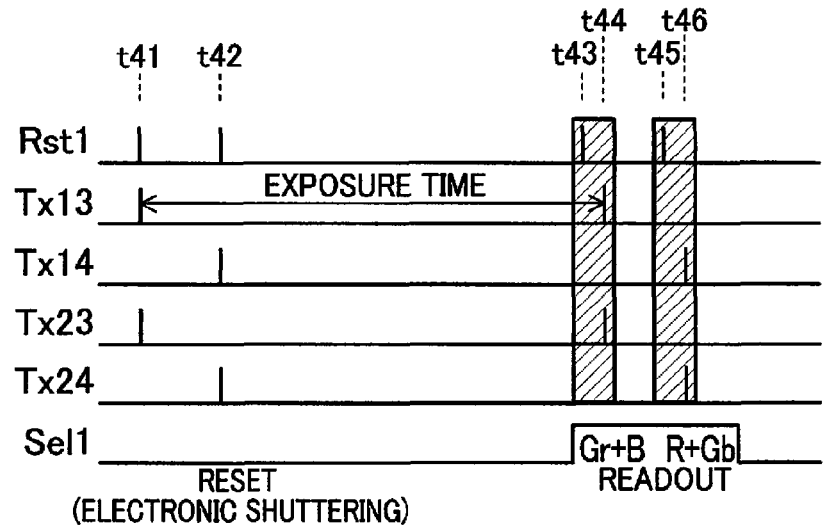

The following describes a method of driving the circuit of FIG. 5 so that pixel signals are added up in accordance with the arrangement of the addition patterns shown in FIG. 2(c). FIG. 6(a) to FIG. 6(c) are sequence diagrams illustrating transfer control signals applied through the transfer control signal lines Tx11 to Tx44 to the transfer transistors, in order that each unit circuit 40 outputs signals resulting from additions in accordance with the corresponding pattern out of the addition patterns 1X, 2V, and 2H. FIG. 6(a) corresponds to the addition pattern 1X, FIG. 6(b) corresponds to the addition pattern 2H, and FIG. 6(c) corresponds to the addition pattern 2V. The following is based on an assumption that, the unit circuits 40 arranged in two rows by three columns in FIG. 5 are driven in accordance with the arrangement of addition patterns of two rows by three columns shown in FIG. 2(c), where an upper left pattern is the addition pattern 1X.

Explanation will be given on the addition pattern 1X, taking the unit circuit 40a as an example. First, as shown in FIG. 6(a), at a time t21, an H level voltage is applied to the reset control signal line Rst1, and simultaneously the H level voltage is applied to the transfer control signal line Tx11 and the transfer control signal line Tx22, thereby to reset photo-generated charges accumulated in the photodiode G11 and the photodiode G22. This operation corresponds to electronic shuttering. As a result that the H level voltage is applied to the reset control signal line Rst1, the reset transistor MR11 is turned ON, and the FD11 is charged to the voltage Vdd. As a result that the H level voltage is applied to the transfer control signal lines Tx11 and Tx22, the transfer transistors MT11 and MT22 are turned ON, and thereby the voltage Vdd is applied to cathode sides of the photodiodes Gr11 and Gb22, so that the photo-generated charges accumulated in the photodiodes G11 and G22 are reset. When the H level voltage applied to the reset control signal line Rst1, the transfer control signal line Tx11, and the transfer control signal line Tx22 transitions to an L level voltage, these control signal lines are turned OFF, and the photodiodes Gr11 and Gb22 start accumulating electrical charges in accordance with respective amounts of received light.

Then, at a time t22, the H level voltage is applied to the reset control signal line Rst1 and simultaneously the H level voltage is applied to the transfer control signal line Tx12 and the transfer control signal line Tx21, thereby to reset photo-generated charges accumulated in the photodiode R12 and the photodiode B21. That is, the voltage Vdd is applied to cathode sides of the photodiodes R12 and B21, and the photo-generated charges accumulated in these photodiodes are reset. When the H level voltage applied to the reset control signal line Rst1, the transfer control signal line Tx12, and the transfer control signal line Tx21 transitions to the L level voltage, the reset transistor MR11, the transfer transistor MT12, and the transfer transistor MT21 are turned OFF, and the photodiodes R12 and B21 start accumulating electrical charges in accordance with respective amounts of received light.

Then, at a time t23, the H level voltage is applied to the row-selection control signal line Sel1 in order to start readout of pixel signals for the photodiodes Gr11 and Gb22. This turns the row-selection transistor MS11 ON, and causes the source of the amplifier transistor MA11 to be connected to the vertical output line L1. In addition, the H level voltage is applied to the reset control signal line Rst1. This turns the reset transistor MR11 ON, thereby charging the FD11 to the voltage Vdd, which initializes a voltage of the FD11. The initialized voltage of the FD11 is amplified by the amplifier transistor MA11, and is outputted via the row-selection transistor MS11 to the vertical output line L1. The initialized voltage of the FD11 outputted to the vertical output line L1 is clamped by the CDS unit 26, as a reference level.

Then, after the reset transistor MR11 is turned OFF, at a time t24, the H level voltage is applied to the transfer control signal line Tx11 and the transfer control signal line Tx22. This turns the transfer transistor MT11 and the transfer transistor MT22 ON, and the voltage of the FD11 is changed depending on an amount of the photo-generated charges of both of the photodiodes Gr11 and Gb22. That is, the photo-generated charges of the photodiode Gr11 and the photodiode Gb22, which respectively correspond to a Gr pixel signal and a Gb pixel signal, are added up in the FD11. Note that, a period starting from the time t21, at which accumulation of electrical charges is started, to the time t24, at which the electrical charges are transferred to the FD 24, corresponds to an exposure time. The voltage resulting from the addition in the FD11 is amplified in the amplifier transistor MA11, and is outputted via the row-selection transistor MS11 to the vertical output line L1. The voltage of the FD11 outputted to the vertical output line L1 is sampled by the CDS unit 26, and a difference from the reference level, which has been sampled in advance, is outputted from the CDS unit 26.

Then, at a time t25, the H level voltage is applied to the reset control signal line Rst1, in order to start readout of pixel signals for the photodiode R12 and the photodiode B21. This turns the reset transistor MR11 ON, thereby charging the FD11 to the voltage Vdd, which initializes the voltage of the FD11. The initialized voltage of the FD11 outputted to the vertical output line L1 is clamped by the CDS unit 26, as a reference level.

Then, after the reset transistor MR11 is turned OFF, at a time t26, the H level voltage is applied to the transfer control signal line Tx12 and the transfer control signal line Tx21. This turns the transfer transistor MT12 and the transfer transistor MT21 ON, and the voltage of the FD11 is changed depending on an amount of photo-generated charges of both of the photodiodes R12 and B21. That is, the photo-generated charges of the photodiode R12 and the photodiode B21, which respectively correspond to an R pixel signal and a B pixel signal, are added up in the FD11. Here, a period from the time t22 to the time t26 corresponds to an exposure time. The voltage resulting from the addition in the FD11 is amplified in the amplifier transistor MA11, and is outputted via the row-selection transistor MS11 to the vertical output line L1. The voltage of the FD11 outputted to the vertical output line L1 is sampled by the CDS unit 26, and a difference from the reference level, which has been sampled in advance, is outputted from the CDS unit 26.

As described above, pixel signals are added up in accordance with the addition pattern 1X, in the unit circuit 40a. Here, in the circuit of FIG. 5, the transfer control signal lines Tx11, Tx12, Tx21, and Tx22 are commonly used by every second unit circuit 40 aligned in the row direction, as transfer control signal lines for four transfer transistors included in each of these unit circuits 40. Therefore, in the case where addition processing of pixel signals in accordance with the addition pattern 1X is executed in the unit circuit 40a, the addition processing in accordance with the addition pattern 1X is also executed in the same way in every second unit circuit 40 aligned in the row including the unit circuit 40a. In the same way, the addition processing in accordance with the addition pattern 1X is executed at the same time in every second unit circuit 40 aligned in the row direction, in each of the rows of the unit circuits 40 positioned below the unit circuit 40a.

Explanation will be given on the addition pattern 2H, taking a unit circuit 40 located below the unit circuit 40a in FIG. 5 (hereinafter referred to as a "unit circuit 40d") as an example. Note that, since operation in the unit circuit 40d is similar to that in the unit circuit 40a, detailed description on the operation of the unit circuit 40d will be omitted, if appropriate. As shown in FIG. 6(b), at a time t31, the H level voltage is applied to the reset control signal line Rst3, the transfer control signal line Tx31, and the transfer control signal line Tx32, at the same time. This charges the FD31 to the voltage Vdd, and resets photo-generated charges accumulated in the photodiode Gr31 and the photodiode R32. When the H level voltage applied to the reset control signal line Rst3, the transfer control signal line Tx31, and the transfer control signal line Tx32 transitions to the L level voltage, the photodiodes Gr31 and R32 start accumulating electrical charges in accordance with respective amounts of received light.

Then, at a time t32, the H level voltage is applied to the reset control signal line Rst1, the transfer control signal line Tx41, and the transfer control signal line Tx42, at the same time. This charges the FD31 to the voltage Vdd, and resets the photo-generated charges accumulated in the photodiode B41 and the photodiode Gb42. When the H level voltage applied to the reset control signal line Rst3, the transfer control signal line Tx41, and the transfer control signal line Tx42 transitions to the L level voltage, the photodiodes B41 and Gb42 start accumulating electrical charges in accordance with respective amounts of received light.

Then, at a time t33, the H level voltage is applied to the row-selection control signal line Sel3 and the reset control signal line Rst3. As a result, a source of the amplifier transistor MA31 is connected to the vertical output line L1, and the reset transistor MR31 is turned ON. This charges the FD31 to the voltage Vdd, which initializes a voltage of the FD31. Further, the initialized voltage of the FD31 is amplified by the amplifier transistor MA31, and is outputted to the vertical output line L1, and the voltage is clamped by the CDS unit 26 as a reference level.

Then, after the reset transistor MR31 is turned OFF, at a time t34, the H level voltage is applied to the transfer control signal lines Tx31 and Tx32. With this, the photo-generated charges of the photodiodes Gr31 and R32, which respectively correspond to a Gr pixel signal and an R pixel signal, are added up in the FD31. Here, an exposure time is a period from the time t31 to the time t34. A result of the addition carried out in the FD31 is outputted from the FD31, in a form of a voltage corresponding to the result. The voltage outputted from the FD31 is amplified in the amplifier transistor MA31, and is outputted via the row-selection transistor MS31 to the vertical output line L1. The voltage of the FD31 outputted to the vertical output line L1 is sampled by the CDS unit 26, and a difference from the reference level, which has been sampled in advance, is outputted from the CDS unit 26.

Then, at a time t35, the H level voltage is applied to the reset control signal line Rst3. As a result, the source of the amplifier transistor MA31 is connected to the vertical output line L1, and the reset transistor MR31 is turned ON. Thereby, the FD31 is charged to the voltage Vdd, and the voltage of the FD31 is initialized. The initialized voltage of the FD31 outputted to the vertical output line L1 is clamped by the CDS unit 26, as a reference level.

Then, after the reset transistor MR31 is turned OFF, at a time t36, the H level voltage is applied to the transfer control signal lines Tx41 and Tx42. With this, the photo-generated charges of the photodiodes B41 and Gb42, which respectively correspond to a B pixel signal and a Gb pixel signal, are added up in the FD31. Here, an exposure time is a period from the time t32 to the time t36. A result of the addition carried out in the FD31 is outputted from the FD31, in a form of a voltage corresponding to the result. The voltage outputted from the FD31 is amplified in the amplifier transistor MA31, and is outputted via the row-selection transistor MS31 to the vertical output line L1. The voltage of the FD31 outputted to the vertical output line L1 is sampled by the CDS unit 26, and a difference from the reference level, which has been sampled in advance, is outputted from the CDS unit 26.

As described above, pixel signals are added up in accordance with the addition pattern 2H, in the unit circuit 40d. Here, in the circuit of FIG. 5, the transfer control signal lines Tx31, Tx32, Tx41, and Tx42 are commonly used by every second unit circuit 40 aligned in the row direction, as transfer control signal lines for four transfer transistors included in each of these unit circuits 40. Therefore, in the case where addition processing of pixel signals in accordance with the addition pattern 2H is executed in the unit circuit 40d, the addition processing in accordance with the addition pattern 2H is also executed in the same way in every second unit circuit 40 aligned in the row including the unit circuit 40d. In the same way, the addition processing in accordance with the addition pattern 2H is executed, at the same time, in every second unit circuit 40 aligned in the row direction, in each of the rows of the unit circuits 40 positioned below the unit circuit 40d.

Explanation will be given on the addition pattern 2V, taking the unit circuit 40b as an example. Note that since operation in the unit circuit 40b is similar to that in the unit circuit 40a, which has been described above, detailed description on the operation of the unit circuit 40b will be omitted, if appropriate. As shown in FIG. 6(c), at a time t41, the H level voltage is applied to the reset control signal line Rst1, the transfer control signal line Tx13, and the transfer control signal line Tx23, at the same time. This charges the FD13 to the voltage Vdd, and resets photo-generated charges accumulated in the photodiode Gr13 and the photodiode B23. When the H level voltage applied to each of the reset control signal line Rst1, the transfer control signal line Tx13, and the transfer control signal line Tx23 transitions to the L level voltage, the photodiodes Gr13 and B23 start accumulating electrical charges in accordance with respective amounts of received light.

Then, at a time t42, the H level voltage is applied to the reset control signal line Rst1, the transfer control signal line Tx14, and the transfer control signal line Tx24, at the same time. This charges the FD13 to the voltage Vdd, and reset photo-generated charges accumulated in the photodiode R14 and the photodiode Gb24. When the H level voltage applied to each of the reset control signal line Rst1, the transfer control signal line Tx14 and the transfer control signal line Tx24 transitions to the L level voltage, the photodiodes R14 and Gb24 start accumulating electrical charges in accordance with respective amounts of received light.

Then, at a time t43, the H level voltage is applied to the row-selection control signal line Sel1 and the reset control signal line Rst1. With this, a source of the amplifier transistor MA13 is connected to the vertical output line L2, and the reset transistor MR13 is turned ON. Thereby, the FD13 is charged to the voltage Vdd, and a voltage of the FD13 is initialized. Further, the initialized voltage of the FD13, which is amplified by the amplifier transistor MA 13, is outputted to the vertical output line L2 and is clamped by the CDS unit 26, as a reference level.

Then, after the reset transistor MR13 is turned OFF, at a time t44, the H level voltage is applied to the transfer control signal lines Tx13 and Tx23. With this, the photo-generated charges of the photodiodes Gr13 and B23, which respectively correspond to a Gr pixel signal and a B pixel signal, are added up in the FD13. Here, an exposure time is a period from the time t41 to the time t44. A result of the addition carried out in the FD13 is outputted from the FD13, in a form of a voltage corresponding to the result. The voltage outputted from the FD13 is amplified in the amplifier transistor MA13, and is outputted via the row-selection transistor MS13 to the vertical output line L2. The voltage of the FD13 outputted to the vertical output line L2 is sampled by the CDS unit 26, and a difference from the reference level, which has been sampled in advance, is outputted from the CDS unit 26.

Then, at a time t45, the H level voltage is applied to the reset control signal line Rst1. With this, the source of the amplifier transistor MA13 is connected to the vertical output line L2, and the reset transistor MR13 is turned ON, with the result that the FD13 is charged to the voltage Vdd and its voltage is initialized. The initialized voltage of the FD13 outputted to the vertical output line L2 is clamped by the CDS unit 26, as a reference level.

Then, after the reset transistor MR13 is turned OFF, at a time t46, the H level voltage is applied to the transfer control signal lines Tx14 and Tx24. With this, the photo-generated charges of the photodiodes R14 and Gb24, which respectively correspond to an R pixel signal and a Gb pixel signal, are added up in the FD13. Here, an exposure time is a period from the time t42 to the time t46. A result of the addition carried out in the FD13 is outputted from the FD13, in a form of a voltage corresponding to the result. The voltage outputted from the FD13 is amplified in the amplifier transistor MA13, and is outputted via the row-selection transistor MS13 to the vertical output line L2. The voltage of the FD13 outputted to the vertical output line L2 is sampled by the CDS unit 26, and a difference from the reference level, which has been sampled in advance, is outputted from the CDS unit 26.

As described above, pixel signals are added up in accordance with the addition pattern 2V, in the unit circuit 40b. Here, in the circuit of FIG. 5, the transfer control signal lines Tx13, Tx14, Tx23, and Tx24 are commonly used by every second unit circuit 40 aligned in the row direction, as transfer control signal lines for four transfer transistors included in each of these unit circuits 40. Therefore, in the case where addition processing of pixel signals in accordance with the addition pattern 2V is executed in the unit circuit 40b, the addition processing in accordance with the addition pattern 2V is also executed in the same way in every second unit circuit 40 aligned in the row including the unit circuit 40b. In the same way, the addition processing in accordance with the addition pattern 2V is executed, at the same time, in every second unit circuit 40 aligned in the row direction, in each of the rows of the unit circuits 40 positioned below the unit circuit 40b.

Figure 7:
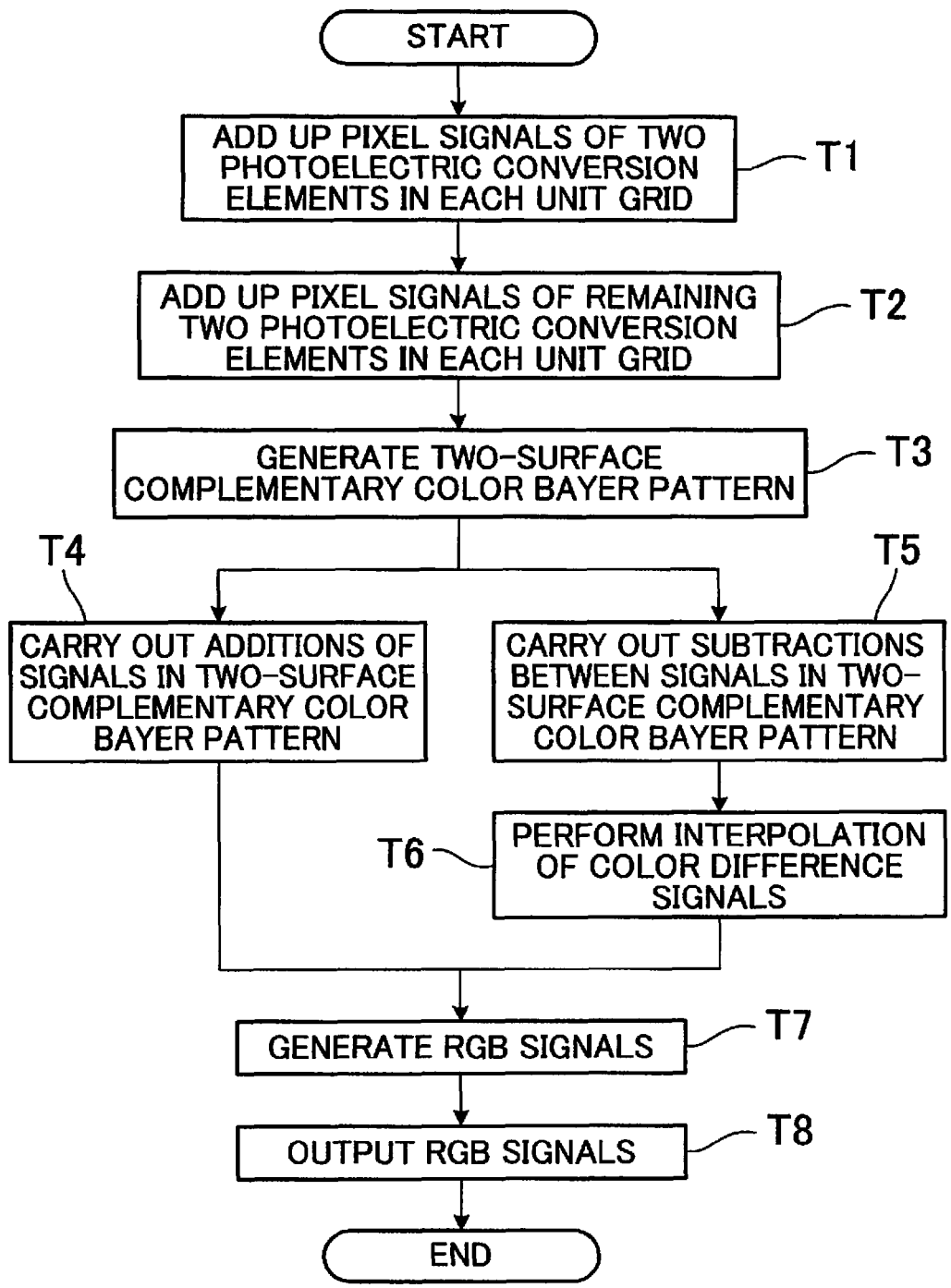
FIG. 7 is a flow chart illustrating an overall flow of processing executed by the imaging device.

The following describes an overall flow of processing executed by the imaging device 1, for outputting signals each indicating RGB color component values determined for each pixel. FIG. 7 is a flow chart illustrating the overall flow of processing executed by the imaging device 1.

First, in the imaging element 20, each signal transfer unit 22 transfers, at the same time, pixel signals to an associated FD 24 from two photoelectric conversion elements 21 of an associated photoelectric conversion element group 21a which corresponds to a Bayer unit grid. With this, the pixel signals from the two photoelectric conversion elements 21 are added up (step T1). Then, each signal transfer unit 22 transfers, at the same time, pixel signals to the FD 24 from the remaining two photoelectric conversion elements 21 of the photoelectric conversion element group 21a. With this, the pixel signals from the remaining two photoelectric conversion elements 21 are added up (step T2). In the step T1 and the step T2, additions of pixel signals are carried out within each photoelectric conversion element group 21a, in accordance with the arrangement of the addition patterns shown in FIG. 2(c). Then, the imaging element 20 generates a two-surface complementary color Bayer pattern from G, Ye, Mg, and Cy signals of generated based on: results of additions in the step T1; and results of additions in the step T2, and outputs the two-surface complementary color Bayer pattern to the image processor 30 (step T3).

Then, the brightness signal generating unit 31 of the image processor 30 generates (i) brightness signals Y through additions of G signals plus Mg signals and (ii) brightness signals Y through additions of Ye signals plus Cy signals, which color signals are in the two-surface complementary color Bayer pattern outputted from the imaging element 20 (step T4). Meanwhile, the color difference signal generating unit 32 of the image processor 30 generates (i) color difference signals C1 through subtractions of Mg signals from G signals and (ii) color difference signals C2 through subtractions of Cy signals from Ye signals, which color signals are in the two-surface complementary color Bayer pattern outputted from the imaging element 20 (step T5). Further, the color interpolation unit 33 of the color difference signal generating unit 32 performs interpolation of the color difference signals C1 and C2, by filtering the results of subtractions obtained in the step T5 with the low-pass filters (step T6).

Then, the RGB signal generating unit 34 of the image processor 30 performs the three-row-by-three-column matrix operation on the brightness signals Y generated in the step T4 and the color difference signals C1 and C2 generated in the step T6, thereby to generate image data having RGB color component values determined for each pixel (step T7). Then, the RGB signal generating unit 34 outputs the generated image data (step T8). Note that, processing from the step T4 to the step T7 corresponds to processing of the steps S1, S21, S22, and S3 of FIG. 4.

The above-described first embodiment brings about the following advantageous effects. First, since the imaging element 20 is structured so that electrical charges are transferred at the same time from the two photoelectric conversion elements 21 to the corresponding FD 24, the number of pixel signals outputted from the FD 24 is decreased to one-half. In the case where a frame rate is fixed, for example, the above structure allows an operating frequency related to operation such as signal transfer conducted by the signal transfer units 22 or an A/D conversion rate of the AFE unit 25 to be decreased to one-half, which leads to a reduction in power consumption. On the other hand, in the case where the operating frequency and the A/D conversion rate are fixed, double frame rate is possible.

Moreover, additions of pixel signals are carried out within each photoelectric conversion element group 21a which corresponds to a two-row-by-two-column Bayer unit grid. Pixel signals of different colors transferred from the photoelectric conversion elements 21 are added up within each photoelectric conversion element group 21a. If pixel signals of a same color are always added up to the contrary, it is necessary to add up pixel signals transferred from photoelectric conversion elements 21 respectively corresponding to different unit grids in order to carry out addition of B plus B or addition of R plus R. This case requires carrying out wiring across a plurality of unit grids to carry out such additions of pixel signals, and makes it difficult to construct a pixel structure for adding up pixel signals. However, in this embodiment, pixel signals of different colors transferred from photoelectric conversion elements 21 are added up within each photoelectric conversion element group 21a, and therefore it is easier to construct the pixel structure for adding up pixel signals.

In addition, the imaging element 20 achieves a decrease in the number of pixel signals, not by merely generating pixel signals which are not read out from the photoelectric conversion elements 21, but by adding up two pixel signals. Therefore, its readout sensitivity is twice as high as that in the case where one of the two pixel signals is not read out to decrease the number of pixel signals to one-half. Further, the two-surface complementary color Bayer pattern outputted from the imaging element 20 include: the digital image signal D1 constituted by G pixel signals and Mg pixel signals; and the digital image signal D2 constituted by Ye pixel signals and Cy pixel signals. From the two-surface complementary color Bayer pattern, the brightness signal Y is generated for every pixel, through addition of G plus Mg and addition of Ye plus Cy, as described in the processing in the image processor 30. These additions of pixel signals for generating the brightness signals Y further doubles the sensitivity. Accordingly, due to (i) the additions of pixel signals in the imaging element 20 and (ii) the additions of pixel signals for generating the brightness signals, the sensitivity is four times as high as the above case, in total.

Furthermore, one FD is shared among four photoelectric conversion elements 21 which correspond to the Bayer unit grid. This basic structure is an already-existing pixel structure for downsizing of the imaging element. In this embodiment, appropriate additions of pixel signals are realized by adjusting the wiring of the transfer control signal lines and the manner of driving the transfer transistors in the already-existing pixel structure. Therefore, the downsized imaging element 20 is achieved without major alterations to the already-existing circuit structure.

Furthermore, in the specific circuit structure shown in FIG. 5, the eight transfer control signal lines are provided for each row of the unit circuits 40, and the four transfer control signal lines out of the eight lines are commonly used by every second unit circuit 40 aligned in the row. Meanwhile, the remaining four transfer control signal lines are commonly used by the other unit circuits 40. In each unit circuit 40, transfer control signals are supplied thorough the associated four transfer control signal lines to the respective transfer transistors, and thereby it is possible to carry out additions of pixel signals in accordance with any of the addition patterns 1X, 2V, and 2H. Therefore, the circuit structure of FIG. 5 is capable of executing various types of addition processing in accordance with arrangement of addition patterns where addition patterns of a same type are aligned in the row direction, and also executing various types of addition processing in accordance with arrangement of addition patterns where two different types of addition patterns are aligned alternately in the row direction. For example, in order that addition processing in accordance with the addition pattern 2V is executed in the unit circuit 40a of FIG. 5, the transfer control signal line Tx11 and the transfer control signal line Tx21 are controlled at the same time, to carry out addition of pixel signals of Gr+B; and the transfer control signal line Tx12 and the transfer control signal line Tx22 are controlled at the same time, to carry out addition of pixel signals of Gb+R. Meanwhile, in order that addition processing in accordance with the addition pattern 2H is executed in the unit circuit 40a of FIG. 5, the transfer control signal line Tx11 and the transfer control signal line Tx12 are controlled at the same time, to carry out addition of pixel signals of Gr+R; and the transfer control signal line Tx21 and the transfer control signal line Tx22 are controlled at the same time, to carry out addition of pixel signals of B+Gb.

Further, each brightness signal Y is generated by adding up two pixel signals in the two-surface complementary color Bayer pattern, in the brightness signal generating unit 31 of the image processor 30, and therefore the brightness signal Y is generated for every sampling position. That is, the brightness signal Y is generated for every pixel, from the two-surface complementary color Bayer pattern outputted from the imaging element 20, without interpolation of pixel signals. Because of this, signals of high brightness resolution are generated from the two-surface complementary color Bayer pattern outputted from the imaging element 20. On the other hand, since the color difference signals C1 and C2 are generated after having been subjected to interpolation processing in the color difference signal generating unit 32, there is a little degradation in color resolution. However, human visual perception is less sensitive to the degradation in color resolution than that in brightness resolution, and therefore the interpolation of the color difference signals C1 and C2 has a little influence on the quality of a final image.

Further, as each brightness signal Y is represented by Y=(G+Mg)/2=(Gr+R+B+Gb)/4, in the image processor 30, its sampling gravity center is positioned at a center of the Bayer unit grid. Also, as the color difference signals C1 and C2 are represented by: C1=(G−Mg)/2=((Gr+Gb)−(R+B))/4; and $C2_V$=$(Ye_V−Cy_V)$/2=((Gb−Gr)+(R−B))/4, respectively, their respective sampling gravity centers are positioned at the center of the Bayer unit grid. Therefore, all the brightness signals Y, color difference signals C1 and color difference signals C2 are generated by additions such that: the sampling gravity centers for additions of pixel signals are at equal intervals in the row direction and the column direction; and each of pitches in the row direction is equal to each of pitches in the column direction. If the sampling gravity centers for the additions of pixel signals depart from the equal-interval positions, there is a possibility that: an obtained image has an effective resolution lower than the resolution decreased as a result of the additions of pixel signals; or folding noise occurs in the image. However, according to the first embodiment, as for all the brightness signals Y, color difference signals C1, and color difference signals C2, the sampling gravity centers are at equal intervals in the row direction and the column direction, and each of the pitches in the row direction is equal to each of the pitches in the column direction. Accordingly, the above-described problem of lower effective resolution or an occurrence of the folding noise is prevented.

Second Embodiment

Figure 8:
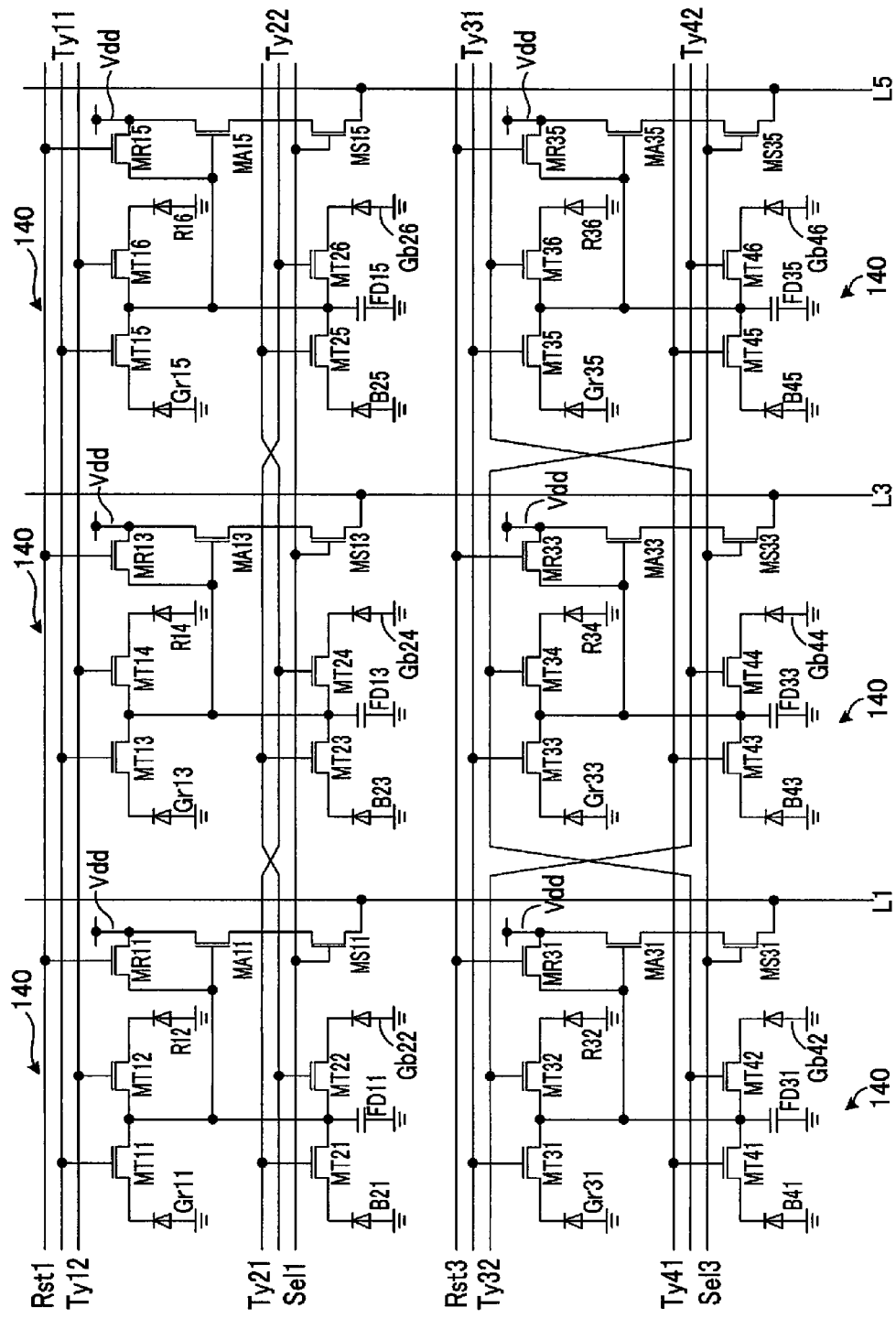
FIG. 8 is a diagram of a specific circuit structure of an imaging element related to a second embodiment.

The following describes a second embodiment related to the present invention, which is another embodiment different from the first embodiment, with reference to FIG. 8. The second embodiment is different from the first embodiment in: the specific circuit structure in the imaging element 20; and the manner of controlling the circuit structure. The other structures are as same as those of the first embodiment, and therefore description thereof will be omitted.

FIG. 8 is a diagram of a specific circuit structure of an imaging element related to the second embodiment. FIG. 8 shows a circuit constituted of unit circuits 140 arranged in three (in the row direction) by two (in the column direction), each of which unit circuits 140 corresponds to the Bayer unit grid. In the actual circuit structure, the unit circuits 140 shown in FIG. 8, together with their peripheral components, of which number corresponds to a total number of pixels in the imaging element of the second embodiment, are arranged in the row direction and in the column direction. In the second embodiment, components which are same as those in the first embodiment will be given the same reference signs, and description thereof will be omitted if appropriate. Note that the structure of each unit circuit 140 is same as that of each unit circuit 40.

Unlike the first embodiment, in the second embodiment, four transfer control signal lines are provided for each row of the unit circuits 140 aligned in the row direction. For example, four transfer control signal lines Ty11, Ty12, Ty21, and Ty22 are respectively connected to four transfer transistors included in each unit circuit 140 in a first (from the top) row in FIG. 8. Of these four transfer control signal lines, the transfer control signal line Ty11 is connected to transfer transistors which transfer electrical charges from respective Gr photodiodes in the respective unit circuits 140. The transfer control signal line Ty12 is connected to transfer transistors which transfer electrical charges from respective R photodiodes in the respective unit circuits 140. That is, the transfer control signal line Ty11 and the transfer control signal line Ty12 are commonly used by the unit circuits 140 aligned in the row direction, as control signal lines each of which is used for the transfer transistors corresponding to the respective photodiodes of one particular color.

On the other hand, the transfer control signal line Ty21 and the transfer control signal line Ty22 are commonly used by the unit circuit 140 aligned in the row direction, but types of combination of the lines and the transfer transistors connected thereto are different between two unit circuits 140 adjacent to each other in the row direction. For example, the transfer control signal line Ty21 is connected to: a transfer transistor MT21 which transfers electrical charge from a photodiode B21; a transfer transistor MT24 which transfers electrical charge from a photodiode Gb24; and a transfer transistor MT25 which transfers electrical charge from a photodiode B25. Meanwhile, the transfer control signal line Ty22 is connected to: a transfer transistor MT22 which transfers electrical charge from a photodiode Gb22; a transfer transistor MT23 which transfers electrical charge from a photodiode B23; and a transfer transistor MT26 which transfers electrical charge from a photodiode Gb26. Thus, out of the transfer control signal lines Ty11, Ty12, Ty21, and Ty22, the two transfer control signal lines Ty21 and Ty22 are connected to the transfer transistors in such a way that the two different types of combination of the lines and the transfer transistors connected thereto in each unit circuit 140 alternate with each other with respect to the row direction.

Out of four transfer control signal lines Ty31, Ty32, Ty41, and Ty42, the transfer control signal line Ty31 is connected to a transfer transistor corresponding to a Gr photodiode in every unit circuit 140, and the transfer control signal line Ty41 is connected to a transfer transistor corresponding to a B photodiode in every unit circuit 140. On the other hand, the transfer control signal line Ty32 and the transfer control signal line Ty42 are connected to transfer transistors in such a way that two different types of combination of the lines and the transfer transistors connected thereto in each unit circuit 140 alternate with each other with respect to the row direction. For example, the transfer control signal line Ty32 is connected to: transfer transistors corresponding to R photodiodes; and a transfer transistor corresponding to a Gb photodiode, alternately with respect to the row direction. The transfer control signal line Ty42 is connected to: transfer transistors corresponding to Gb photodiodes; and a transfer transistor corresponding to an R photodiode, alternately with respect to the row direction, in reverse order to that of the transfer control signal line Ty32.

In the second embodiment having the above-described circuit structure, controlling the transfer control signal line Ty11 and the transfer control signal line Ty22 so as to supply transfer control signals to their respective transfer transistors at the same time enables (i) the transfer transistors MT11, MT13, and MT15 to transfer electrical charges from the respective photodiodes at the same time, and (ii) the transfer transistors MT22, MT23, and MT26 to transfer electrical charges from the respective photodiodes at the same time. With this, addition of Gr plus Gb and addition of Gr plus B are carried out in the unit circuits 40 alternately with respect to the row direction. Further, controlling the transfer control signal line Ty12 and the transfer control signal line Ty21 so as to supply transfer control signals to their respective transfer transistors at the same time enables (i) the transfer transistors MT12, MT14, and MT16 to transfer electrical charges from the respective photodiodes at the same time, and (ii) the transfer transistors MT21, MT24, and MT25 to transfer electrical charges from the respective photodiodes at the same time. With this, addition of R plus B and addition of R plus Gb are carried out in the unit circuit 140 alternately with respect to the row direction.

That is, in the circuit structure of FIG. 8, by combining (i) controlling the transfer control signal line Ty11 and the transfer control signal line Ty22 so as to supply transfer control signals to their respective transfer transistors at the same time and (ii) controlling the transfer control signal line Ty12 and the transfer control signal line Ty21 so as to supply transfer control signals to their respective transfer transistors at the same time, it is possible to carry out additions of pixel signals so that the additions in accordance with the addition pattern 1X and the additions in accordance with the addition pattern 2V are carried out repeatedly and alternately with respect to the row direction. In the same way, by combining (i) controlling the transfer control signal line Ty31 and the transfer control signal line Ty32 so as to supply transfer control signals to their respective transfer transistors at the same time and (ii) controlling the transfer control signal line Ty41 and the transfer control signal line Ty42 so as to supply transfer control signals to their respective transfer transistors at the same time, it is possible to carry out additions of pixel signals so that the additions in accordance with the addition pattern 2H and the additions in accordance with the addition pattern 1X are carried out repeatedly and alternately with respect to the row direction. Accordingly, as well as the circuit structure of FIG. 5, the circuit structure of FIG. 8 is capable of executing addition processing in accordance with the arrangement of addition patterns shown in FIG. 2(c).

Furthermore, by combining (i) controlling the transfer control signal line Ty11 and the transfer control signal line Ty21 so as to supply transfer control signals to their respective transfer transistors at the same time and (ii) controlling the transfer control signal line Ty12 and the transfer control signal line Ty22 so as to supply transfer control signals to their respective transfer transistors at the same time, it is possible to carry out additions of pixel signals so that the additions in accordance with the addition pattern 2V and the additions in accordance with the addition pattern 1X are carried out repeatedly and alternately with respect to the row direction. Meanwhile, by combining (i) controlling the transfer control signal line Ty31 and the transfer control signal line Ty42 so as to supply transfer control signals to their respective transfer transistors at the same time and (ii) controlling the transfer control signal line Ty32 and the transfer control signal line Ty41 so as to supply transfer control signals to their respective transfer transistors at the same time, it is possible to carry out additions of pixel signals so that the additions in accordance with the addition pattern 1X and the additions in accordance with the addition pattern 2H are carried out repeatedly and alternately with respect to the row direction.

In the above-described second embodiment, four transfer control signal lines are provided for each row of the unit circuits 140. Two lines out of the four transfer control signal lines are commonly used by unit circuits 140 adjacent to each other in the row direction in such a way that the two lines interchange with each other in one of two adjacent unit circuits 140, and this achieves a structure capable of executing the addition processing corresponding to FIG. 2(c). Therefore, the addition processing corresponding to FIG. 2(c) is executed using the transfer control signal lines of which number is one-half of that of the circuit structure of FIG. 5. Accordingly, the second embodiment is effective when there is a limitation on the number of transfer control signal lines due to a demand for a reduction in size of pixels. In addition, the second embodiment is capable of dealing with various types of addition processing by varying the arrangement of addition patterns described above.

Third Embodiment

The following describes a third embodiment, which is still another embodiment related to the present invention, with reference to FIG. 9. The third embodiment is different from the first embodiment in that, an imaging element is adapted to interlaced output constituted by odd-field output for odd lines and even-field output for even lines, which are repeated alternately. In the third embodiment, arrangement of patterns for additions of pixel signals in the imaging element is different from that of the first embodiment, and thereby the imaging element is adapted to the interlaced output.

FIG. 9(a) and FIG. 9(f) each illustrates arrangement of addition patterns used for additions of pixel signals in the third embodiment, in place of that of FIG. 2(c). FIG. 9(a) represents arrangement of addition patterns for the odd-field output, while FIG. 9(f) represents arrangement of addition patterns for the even-field output.

When pixel signals are added up in accordance with the arrangement of addition patterns shown in FIG. 9(a), and G and Ye signals out of signals resulting from the additions are arranged in accordance with the arrangement shown in FIG. 9(a), a digital image signal shown in FIG. 9(b) is generated. Meanwhile, when pixel signals are added up in accordance with the arrangement of addition patterns shown in FIG. 9(a), and Mg and Cy signals out of the signals resulting from the additions are arranged in accordance with the arrangement shown in FIG. 9(a), a digital image signal shown in FIG. 9(c) is generated. In the digital image signal shown in FIG. 9(b), each pair of pixel signals of a same color which are aligned in the column direction and encircled with a broken line are added up, and a resulting image signal shown in FIG. 9(d) is outputted for the odd lines. Meanwhile, in the digital image signal shown in FIG. 9(c), each pair of pixel signals of a same color which are aligned in the column direction and encircled with a broken line are added up, and a resulting image signal shown in FIG. 9(e) is outputted for the odd lines.

On the other hand, when pixel signals are added up in accordance with the arrangement of addition patterns shown in FIG. 9(f), and G and Ye signals out of signals resulting from the additions are arranged in accordance with the arrangement shown in FIG. 9(f), a digital image signal shown in FIG. 9(g) is generated. Meanwhile, when pixel signals are added up in accordance with the arrangement of addition patterns shown in FIG. 9(f), and Mg and Cy signals out of the signals resulting from the additions are arranged in accordance with the arrangement shown in FIG. 9(f), a digital image signal shown in FIG. 9(h) is generated. In the digital image signal shown in FIG. 9(g), each pair of pixel signals of a same color which are aligned in the column direction and encircled with a broken line are added up, and a resulting image signal shown in FIG. 9(i) is outputted for the even lines. Meanwhile, in the digital image signal shown in FIG. 9(h), each pair of pixel signals of a same color which are aligned in the column direction and encircled with a broken line are added up, and a resulting image signal shown in FIG. 9(j) is outputted for the even lines.

In the third embodiment, as shown in FIG. 9(d), FIG. 9(e), FIG. 9(i), and FIG. 9(j), since the digital image signals of two-surface complementary color Bayer pattern are outputted from the imaging element for the odd lines and for the even lines separately, the imaging element is capable of being adapted to the interlaced output.

Fourth Embodiment

The following describes a fourth embodiment, which is still another embodiment related to the present invention, with reference to FIG. 10(a) and FIG. 10(b). The fourth embodiment is different from the first embodiment in arrangement of patterns for additions of pixel signals in the imaging element. The arrangement of the first embodiment includes all of the addition patterns 1X, 2V, and 2H, while the arrangement of the fourth embodiment includes only the addition pattern 1X and the addition pattern 2V. As shown in FIG. 10(a), the addition patterns 1X and the addition patterns 2V are arranged alternately in the row direction and alternately in the column direction. Alternatively, in the fourth embodiment, only the addition patterns 1X and the addition patterns 2H may be arranged alternately in the row direction and alternately in the column direction, as shown in FIG. 10(b).

When addition processing is executed in accordance with the above arrangement of FIG. 10(a), each addition pattern 2V yields a Ye pixel signal and a Cy pixel signal. Meanwhile, when addition processing is executed in accordance with the arrangement of FIG. 10(b), each addition pattern 2H yields a Ye pixel signal and a Cy pixel signal. Because of this, according to the fourth embodiment, whichever arrangement of addition patterns is used between the arrangements of FIG. 10(a) and FIG. 10(b), generated are digital image signals having color pattern same as the two-surface complementary color Bayer pattern of the first embodiment.

Fifth Embodiment

The following describes a fifth embodiment, which is still another embodiment related to the present invention, with reference to FIG. 10(c) and FIG. 10(d). The fifth embodiment is different from the first embodiment in that, in the imaging element 20, two types of addition processing different from each other are executed repeatedly and alternately so that the types are different between two successive frames. FIG. 10(c) represents arrangement of addition patterns corresponding to the addition processing in an nth frame (n: natural number) (first-type addition processing), and FIG. 10(d) represents arrangement of addition patterns corresponding to addition processing in an (n+1)th frame (second-type addition processing). The arrangement of FIG. 10(c) is same as the arrangement of FIG. 2(c), and the arrangement of FIG. 10(d) corresponds to the arrangement of FIG. 10(c) except that each addition pattern 2V and each addition pattern 2H are reversed with each other. In the fifth embodiment, color difference signals C2 of the nth frame and color difference signals C2 of the (n+1)th frame are added up and averaged, and this eliminates a possibility that false color signals are included in the color difference signals C2 which have been subjected to interpolation. The reason is as follows.

Assuming that a sampling frequency of the imaging element is Fs, a worst false color signal is generated in the color difference signals C2 when the following conditions are satisfied: (1) a direction of brightness change (vertical streaks or horizontal streaks) is same as a direction of addition (the row direction or the column direction); (2) a period of brightness change is ¼ Fs; and (3) there is a 90-degree phase shift. For example, let us assume that vertical streaks shown in FIG. 11(a) appear. When the addition processing of FIG. 10(c) is executed, the above conditions (1) to (3) are satisfied, and worst false color pixel signals are generated in the color difference signals C2. That is, since C2=Ye−Cy=(R+Gb)−(B+Gr) and the brightness change is as shown in FIG. 11(a), in each unit circuit corresponding to the addition pattern 2V, an evaluation value of the false color signal included in the color difference signals C2 is (0+0)−(1+1)=−2. On the other hand, in each unit circuit corresponding to the addition pattern 2H, since the direction of brightness change is orthogonal to the direction of additions, an evaluation value of the false color signal is (1+0)−(0+1)=0, and therefore no false color signal is generated.

Further, when the addition processing of FIG. 10(d) is executed, the positions of the addition pattern 2V and the positions of the addition pattern 2H are reversed with each other compared to the addition processing of FIG. 10(c), and therefore in each unit circuit corresponding to the addition pattern 2V, the evaluation value of the false color signal is (1+1)−(0+0)=2. On the other hand, in each unit circuit corresponding to the addition pattern 2H, the evaluation value is (1+0)−(0+1)=0.

Figure 11B:
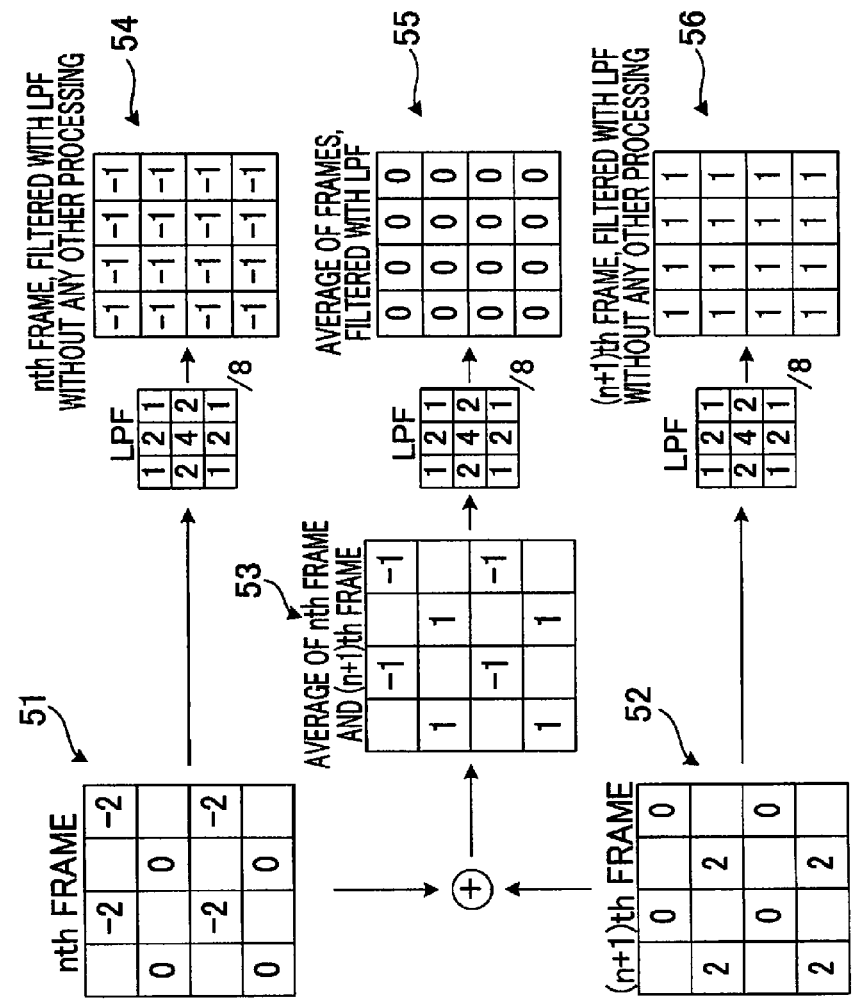
FIG. 11(a) and FIG. 11(b) are schematic diagrams for illustrating false color signals included in color difference signals in the fifth embodiment.
Figure 11A:
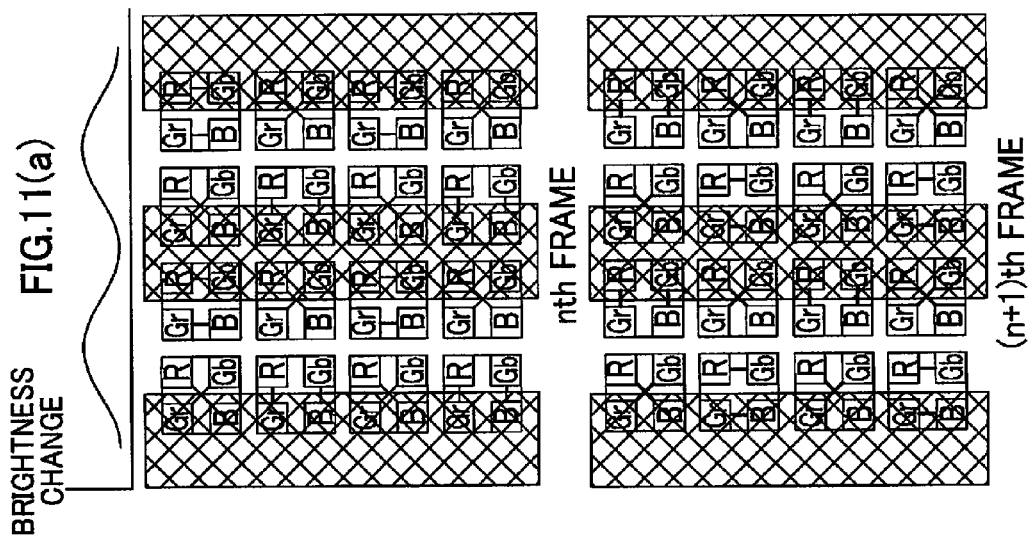

Therefore, in color difference signals C2 obtained from the addition processing of nth frame shown in FIG. 10(c), false color signals are included in a manner shown in an arrangement diagram 51 of FIG. 11(b). Meanwhile, in color difference signals C2 obtained from the addition processing of (n+1)th frame shown in FIG. 10(d), false color signals are included in a manner shown in an arrangement diagram 52 FIG. 11(b). When the color difference signals C2 of the nth frame are filtered with a low-pass filter without any other processing, a false color signal having the evaluation value of −1 is generated for each pixel, as shown in an arrangement diagram 54. Meanwhile, when the color difference signals C2 of the (n+1)th frame are filtered with a low-pass filter without any other processing, a false color signal having the evaluation value of +1 is generated for each pixel, as shown in an arrangement diagram 56. As shown in the arrangement diagram 54 and the arrangement diagram 56, there is an inversion (180-degree shift) in phase of false color signals between the nth frame and the (n+1)th frame. Therefore, as a result of taking an average for signals of the nth frame and the (n+1)th frame, false color signals are arranged as shown in an arrangement diagram 53. Then, when the obtained result is filtered with the low-pass filter, the false color signals are averaged in each pixel as shown in an arrangement diagram 55, with the result that all the false color signals have the evaluation value of 0 (zero). Thus, the color difference signals C2 of the nth frame resulting from the addition processing of FIG. 10(c) and the color difference signals C2 of the (n+1)th frame resulting from the addition processing of FIG. 10(d) are added up and then averaged, and this eliminates the possibility that false color signals are included in the color difference signals C2 which have been subjected to interpolation.

(Modifications)

The following describes modifications related to the above-described first to fifth embodiments.

[1] In the above-described first embodiment, the transfer control unit 23 controlling the signal transfer units 22 which transfer electrical charges from the photoelectric conversion elements 21 is provided in the imaging element 20. However, the transfer control unit 23 may be provided independently from the imaging element 20, as a drive device which drives the imaging element 20. For example, the imaging element 20 is provided with a relay terminal connected to the transfer control signal lines, and through this relay terminal, the above-described drive device is connected to the transfer control signal lines. The drive device may drive the transfer transistors through the transfer control signal lines, in the same way as the transfer control unit 23 of the first embodiment, thereby to cause the imaging element 20 to output the two-surface complementary color Bayer pattern. In this case, an imaging element having the already-existing pixel structure may be used as long as the transfer control signal lines are wired so that the two-surface complementary color Bayer pattern can be outputted as a result of additions of signals outputted from the photoelectric conversion elements 21.

[2] The first to fifth embodiments each deals with a structure that pixel signals are added up within the imaging element. However, the present invention may be implemented in a form of an image processing device which generates the two-surface complementary color Bayer pattern by image processing, in which Bayer-arranged RGB pixel signals outputted from the imaging element are added up. In this case, as the imaging element, there may be used a conventional imaging element which outputs Bayer-arranged RGB pixel signals. This image processing device samples two pixel signals in each Bayer unit grid of the image signals outputted from the imaging element, and adds up the two pixel signals sampled, so that the two-surface complementary color Bayer pattern is generated. Therefore, in this image processing device, the number of pixel signals sampled for adding up pixel signals is limited, and a throughput needed for readout of sampled pixel signals per frame or a throughput for adding up pixel signals is smaller, compared to a device of conventional art in which the number of sampled pixel signals is larger. Accordingly, in the case where an image is processed with a frame rate same as that of the conventional device, for example, the throughput per unit time is smaller, which leads to a reduction in power consumption. Meanwhile, in the case where the throughput per unit time is same as that of the conventional device, it is possible to increase the frame rate.

Further, as same as the first embodiment, this image processing device employs additions of pixel signals to decrease the number of pixel signals, and generates brightness signals Y by adding up pixel signals of two-surface complementary color Bayer pattern, and therefore its sensitivity is improved. Furthermore, since it is not necessary to perform interpolation when generating brightness signals Y, signals of high brightness resolution are generated.

[3] In the above-described first to fifth embodiments, in the form of the two-surface complementary color Bayer pattern, a digital image signal constituted of G signals and Ye signals and a digital image signal constituted of Mg signals and Cy signals are outputted from the imaging element. However, each of the digital image signals, which is a result of additions of pixel signals in the imaging element, may have another color combination different from the above combinations, and be outputted. That is, in the form of the two-surface complementary color Bayer pattern, a digital image signal constituted of G signals and Cy signals, and a digital image signal constituted of Mg signals and Ye signals may be outputted from the imaging element.

[4] In the above-described first embodiment, the imaging element of horizontal 4000 pixels by vertical 3000 pixels outputs a two-surface complementary color Bayer pattern of horizontal 1920 pixels by vertical 1080 pixels, for an HD moving image. However, an imaging element of horizontal 2592 pixels by vertical 1944 pixels may output a two-surface complementary color Bayer pattern of horizontal 1280 pixels by horizontal 720 pixels, for an HD moving image. In this case, pixel signals outputted from the photoelectric conversion elements corresponding to an image of horizontal 2560 pixels by vertical 1440 pixels are added up in the imaging element in the same way as in the first embodiment, and two-surface complementary color Bayer pattern of halved horizontal and vertical pixels are outputted.

[5] In the above-described first embodiment, the image processing shown in FIG. 4 is executed in the image processor 30. However, the image processing shown in FIG. 4 may be executed in the imaging element 20. That is, image data having RGB color component values determined for each pixel may be generated in the imaging element 20 from the two-surface complementary color Bayer pattern. In addition, in the imaging element 20, downsampling may be further performed, using a low-pass filter, on the image data having RGB color component values determined for each pixel, thereby to generate Bayer-arranged RGB signals. Here, from two-row-by-two-column image data having RGB color component values determined for each pixel, image data of Bayer-arranged RGB signals of two rows by two columns is generated. Accordingly, from Bayer-arranged RGB image signals outputted from the photoelectric conversion elements 21, image data of Bayer-arranged RGB signals of which vertical and horizontal numbers are decreased to one-half is generated, and the image data of Bayer-arranged signals is outputted from the imaging element 20.

In this modification, it is necessary to perform interpolation on the image data of Bayer-arranged signals outputted from the imaging element 20 at a stage downstream of the imaging element 20, thereby to generate image data having RGB color component values determined for each pixel. However, since the imaging element 20 outputs the image data of Bayer-arranged signals, which are arranged in a conventional manner, already-existing processing may be used for signal processing for interpolation on the image data executed downstream of the imaging element 20. Note that, depending on the type of the signal processing executed downstream of the imaging element 20, there is a possibility that high-frequency components of brightness signals are degraded, or a false color signal is generated.

The low-pass filter used in this modification corresponds to an optical low-pass filter in an already-existing imaging system. By changing a coefficient of the digital filter, it is possible to control characteristics of Bayer image outputted from the imaging element 20. As described above, as for the brightness signals Y, and the color difference signals C1 and C2, which are generated in the image processing of FIG. 4, their respective sampling gravity centers are at equal intervals in the row direction and the column direction, and each of the pitches in the row direction is equal to each of the pitches in the column direction. The same is applied to the image data having RGB color component values determined for each pixel, which is generated from the brightness signals Y and the color difference signals C1 and C2. Therefore, also for the image data of Bayer-arranged signals generated from this image data, its sampling gravity centers are at equal intervals. Accordingly, this modification makes it possible to produce a higher quality image, compared to a case where so-called 2 by 2 binning is adopted.

The foregoing described preferred embodiments of the present invention, however, the present invention is not limited to the above-described embodiments, and various changes can be made within the scope of the description in Solution to Problem.

INDUSTRIAL APPLICABILITY

The present invention is applicable to a case where an imaging element outputs image signals after limiting the number of pixel signals.

REFERENCE SIGNS LIST

Y . . . brightness signal; C1, C2 . . . color difference signal; 1 . . . imaging device; 1X, 2H, 2V . . . addition pattern; 10 . . . image capture optical system; 20 . . . imaging element; 21 . . . photoelectric conversion elements; 22 . . . signal transfer units; 23 . . . transfer control unit; 26 . . . CDS unit; 27 . . . AGC unit; 28 . . . ADC unit; 30 . . . image processor; 31 . . . brightness signal generating unit; 32 . . . color difference signal generating unit; 33 . . . color interpolation unit; 34 . . . signal generating unit

The invention claimed is:

1. An imaging element, comprising:
a plurality of color filters arranged in a Bayer array where two-row-by-two-column unit grids of primary colors of R (red), G (green), and B (blue) are arranged;
photoelectric conversion elements provided for the respective color filters, each of which elements outputs an analog signal corresponding to an intensity of light having passed through an associated color filter;
a signal adder circuit which carries out additions in each of the unit grids, by (i) adding up signals outputted from two photoelectric conversion elements corresponding to different colors of two color filters out of four color filters, and (ii) adding up signals outputted from two photoelectric conversion elements corresponding to remaining two color filters, and then outputs analog signals corresponding to respective results of the additions; and
an A/D converter which converts the signals outputted from the signal adder circuit to digital signals and outputs the digital signals;
wherein based on the signals outputted from the signal adder circuit, the imaging element outputs: (i) a first digital image signal where signals of one color out of Ye (yellow) and Cy (cyan), and signals of G, are alternately placed; and (ii) a second digital image signal where signals of an other color out of Ye and Cy, which is different from the one color, and signals of Mg (magenta), are alternately placed.

2. The imaging element according to claim 1,
wherein the signal adder circuit carries out additions of signals outputted from the photoelectric conversion elements in each of the unit grids, in accordance with any of a first to a third patterns which are different from one another;
wherein the first pattern is configured so that, in each of the unit grids, signals outputted from two photoelectric conversion elements respectively corresponding to two G color filters are added up and signals outputted from two photoelectric conversion elements respectively corresponding to R and B color filters;
wherein the second pattern is configured so that, in each of the unit grids, signals outputted from two photoelectric conversion elements respectively corresponding to G and R color filters aligned in a row direction are added up, and signals outputted from two photoelectric conversion elements respectively corresponding to B and G color filters aligned in the row direction are added up; and wherein the third pattern is configured so that, in each of the unit grids, signals outputted from two photoelectric conversion elements respectively corresponding to G and B color filters aligned in a column direction are added up, and signals outputted from two photoelectric conversion elements respectively corresponding to R and G color filters aligned in the column direction are added up.

3. The imaging element according to claim 2,
wherein the signal adder circuit carries out, repeatedly and alternately with respect to the column direction, (i) additions for one row in which signals outputted from the photoelectric conversion elements are added up in each of the unit grids, using the first pattern and the third pattern repeatedly and alternately with respect to the row direction, and (ii) additions for another row in which signals outputted from the photoelectric conversion elements are added up in each of the unit grids, using the second pattern and the first pattern repeatedly and alternately with respect to the row direction.

4. The imaging element according to claim 2,
wherein the signal adder circuit carries out, repeatedly and alternately with respect to the column direction, (i) additions for one row in which signals outputted from the photoelectric conversion elements are added up in each of the unit grids, using the first pattern and the second pattern repeatedly and alternately with respect to the row direction, and (ii) additions for another row in which signals outputted from the photoelectric conversion elements are added up in each of the unit grids, using the second pattern and the first pattern repeatedly and alternately with respect to the row direction.

5. The imaging element according to claim 2,
wherein the signal adder circuit carries out, repeatedly and alternately with respect to the column direction, (i) additions for one row in which signals outputted from the photoelectric conversion elements are added up in each of the unit grids, using the first pattern and the third pattern repeatedly and alternately with respect to the row direction, and (ii) additions for another row in which signals outputted from the photoelectric conversion elements are added up in each of the unit grids, using the third pattern and the first pattern repeatedly and alternately with respect to the row direction.

6. The imaging element according to claim 2,
wherein the signal adder circuit executes repeatedly and alternately first-type addition processing and second-type addition processing, which are different in a placement order of the first to the third patterns, so that a type of addition processing is different between two successive frames;
wherein in the first-type addition processing, the signal adder circuit carries out, repeatedly and alternately with respect to the column direction, (i) additions for one row in which signals outputted from the photoelectric conversion elements are added up in each of the unit grids, using the first pattern and the third pattern repeatedly and alternately with respect to the row direction, and (ii) additions for another row in which signals outputted from the photoelectric conversion elements are added up in each of the unit grids, using the second pattern and the first pattern repeatedly and alternately with respect to the row direction; and
wherein in the second-type addition processing, the signal adder circuit carries out, repeatedly and alternately with respect to the column direction, (i) additions for one row in which signals outputted from the photoelectric conversion elements are added up in each of the unit grids, using the first pattern and the second pattern repeatedly and alternately with respect to the row direction, and (ii) additions for another row in which signals outputted from the photoelectric conversion elements are added up in each of the unit grids, using the third pattern and the first pattern repeatedly and alternately with respect to the row direction.

7. The imaging element according to claim 1,
wherein the signal adder circuit has transfer transistors which are provided for the respective photoelectric conversion elements, and transfer electrical charges generated by the respective photoelectric conversion elements, and the signal adder circuit is configured so that electrical charges are transferred at the same time from two transfer transistors to a floating diffusion which is shared among four transfer transistors corresponding to each one of the unit grids.

8. The imaging element according to claim 7,
wherein eight transfer control signal lines which transmit transfer control signals to the transfer transistors are provided for each row of the unit grids; and
wherein four lines out of the eight transfer control signal lines are commonly used by every second unit grid aligned in the row direction, for four transfer transistors in each unit grid.

9. The imaging element according to claim 7,
wherein four transfer control signal lines which transmit transfer control signals to the transfer transistors are provided for each row of the unit grids; and
wherein the four transfer control signal lines are commonly used by two unit grids adjacent to each other in the row direction so that two of the four lines interchange with each other in one of the two unit grids.

10. The imaging element according to claim 2, which is adapted to interlaced output constituted by odd-field output for odd lines and even-field output for even lines, which are repeated alternately,
wherein the signal adder circuit carries out, repeatedly and alternately with respect to the column direction, (i) additions for one row in which signals outputted from the photoelectric conversion elements are added up in each of the unit grids, using the first pattern and the third pattern repeatedly and alternately with respect to the row direction, and (ii) additions for another row in which signals outputted from the photoelectric conversion elements are added up in each of the unit grids, using the first pattern and the second pattern repeatedly and alternately with respect to the row direction, and then the signal adder circuit adds up signals of a same color adjacent to each other in the column direction and outputs obtained signals as the odd-field output; and
wherein the signal adder circuit carries out, repeatedly and alternately with respect to the column direction, (i) additions for one row in which signals outputted from the photoelectric conversion elements are added up in each of the unit grids, using the third pattern and the first pattern repeatedly and alternately with respect to the row direction, and (ii) additions for another row in which signals outputted from the photoelectric conversion elements are added up in each of the unit grids, using the first pattern and the second pattern repeatedly and alternately with respect to the row direction, and then the signal adder circuit adds up signals of a same color adjacent to each other in the column direction and outputs obtained signals as the even-field output.

11. A drive device of an imaging element, which device drives the imaging element including: a plurality of color filters arranged in a Bayer array where two-row-by-two-column unit grids of primary colors of R (red), G (green), and B (blue) are arranged; photoelectric conversion elements provided for the respective color filters, each of which elements outputs an analog signal corresponding to an intensity of light having passed through an associated color filter; a signal adder circuit which carries out additions of signals outputted from the photoelectric conversion elements, and outputs analog signals respectively corresponding to results of the additions; and an A/D converter which converts the signals outputted from the signal adder circuit to digital signals and then outputs the digital signals,
wherein the drive device controls the signal adder circuit so that the signals outputted from the signal adder circuit result from (i) addition of signals outputted from two photoelectric conversion elements corresponding to two color filters out of four color filters in each of the unit grids, and (ii) addition of signals outputted from two photoelectric conversion elements corresponding to remaining two color filters in each of the unit grids, and
wherein the drive device causes the imaging element to output: (i) a first digital image signal where signals of one color out of Ye (yellow) and Cy (cyan), and signals of G are alternately placed; and (ii) a second digital image signal where signals of an other color out of Ye and Cy, which is different from the one color, and signals of Mg (magenta) are alternately placed, based on the signals outputted from the signal adder circuit.

12. A method of driving an imaging element including: a plurality of color filters arranged in a Bayer array where two-row-by-two-column unit grids of primary colors of R (red), G (green), and B (blue) are arranged; photoelectric conversion elements provided for the respective color filters, each of which elements outputs an analog signal corresponding to an intensity of light having passed through an associated color filter; a signal adder circuit which carries out additions of signals outputted from the photoelectric conversion elements, and outputs analog signals respectively corresponding to results of the additions; and an A/D converter which converts the signals outputted from the signal adder circuit to digital signals and then outputs the digital signals, the method comprising:
controlling the signal adder circuit so that the signals outputted from the signal adder circuit are resulted from (i) addition of signals outputted from two photoelectric conversion elements corresponding to two color filters out of four color filters in each of the unit grids, and (ii) addition of signals outputted from two photoelectric conversion elements corresponding to remaining two color filters in each of the unit grids; and
causing the imaging element to output: (i) a first digital image signal where signals of one color out of Ye (yellow) and Cy (cyan), and signals of G are alternately placed; and (ii) a second digital image signal where signals of an other color out of Ye and Cy, which is different from the one color, and signals of Mg (magenta) are alternately placed, based on the signals outputted from the signal adder circuit.

13. An image processing device, comprising:
a brightness signal generating unit which generates brightness signals by carrying out addition of a signal for each pixel in the first digital image signal plus a signal for a corresponding pixel in the second digital image signal, the first and second digital image signals being outputted from the imaging element according to claim 1;
a color difference signal generating unit which generates color difference signals by carrying out subtraction between a signal for each pixel in the first digital image signal and a signal for a corresponding pixel in the second digital image signal; and an image data generating unit which generates image data having RGB color component values determined for each pixel, based on the brightness signals generated by the brightness signal generating unit and the color difference signals generated by the color difference signal generating unit.

14. The image processing device according to claim 13, wherein the color difference signal generating unit generates the color difference signals by performing interpolation, using a low-pass filter, on a result obtained from the subtraction between a signal for each pixel in the first digital image signal and a signal for a corresponding pixel in the second digital image signal.

15. An image processing device, comprising:
a plurality of color filters arranged in a Bayer array where two-row-by-two-column unit grids of primary colors of R (red), G (green), and B (blue) are arranged;
a pixel signal generating unit which generates pixel signals for the respective color filters, each of which signals indicates an intensity of light having passed through a corresponding color filter; and
a signal adder unit which executes processing such that, in each of the unit grids, (i) signals outputted from two photoelectric conversion elements corresponding to two color filters out of four color filters are added up, and (ii) signals outputted from two photoelectric conversion elements corresponding to remaining two color filters are added up, and then outputs signals corresponding to respective results of additions;
wherein the image processing device generates: (i) a first digital image signal where signals of one color out of Ye (yellow) and Cy (cyan), and signals of G are alternately placed; and (ii) a second digital image signal where signals of an other color out of Ye and Cy, which is different from the one color, and signals of Mg (magenta) are alternately placed, based on the signals outputted from the signal adder unit.

16. An image processing method comprising the steps of:
a brightness signal generating step of generating brightness signals by carrying out addition of a signal for each pixel in the first digital image signal plus a signal for a corresponding pixel in the second digital image signal, the first and second digital image signals being outputted from the imaging element according to claim 1;
a color difference signal generating step of generating color difference signals by carrying out subtraction between a signal for each pixel in the first digital image signal and a signal for a corresponding pixel in the second digital image signal; and
an image data generating step of generating image data having RGB color component values determined for each pixel, based on the brightness signals generated by the brightness signal generating step and the color difference signals generated by the color difference signal generating step.

17. The image processing method according to claim 16, wherein, in the color difference signal generating step, the color difference signals are generated by performing interpolation, using a low-pass filter, on a result obtained from the subtraction between a signal for each pixel in the first digital image signal and a signal for a corresponding pixel in the second digital image signal.

18. An imaging device, comprising:
an image capture optical system which forms a subject image;
the imaging element according to claim 1, which carries out photoelectric conversion on the subject image formed by the image capture optical system into signals and outputs the signals; and
an image processing device which performs predetermined signal processing on the signals outputted from the imaging element to reproduce the subject image.

* * * * *